(12) United States Patent
Grubb et al.

(10) Patent No.: US 7,046,430 B2
(45) Date of Patent: *May 16, 2006

(54) OPTICAL TRANSMISSION SYSTEMS INCLUDING SIGNAL VARYING DEVICES AND METHODS

(75) Inventors: Stephen G. Grubb, Ellicott City, MD (US); Raymond Zanoni, Columbia, MD (US); Thomas D. Stephens, Brighton (AU)

(73) Assignee: Corvis Corporation, Columbia, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 10/914,109

(22) Filed: Aug. 9, 2004

(65) Prior Publication Data

US 2005/0046929 A1 Mar. 3, 2005

Related U.S. Application Data

(60) Continuation of application No. 10/032,051, filed on Dec. 21, 2001, now Pat. No. 6,775,056, which is a continuation-in-part of application No. 09/253,819, filed on Feb. 19, 1999, now Pat. No. 6,344,922, which is a continuation-in-part of application No. 09/119,556, filed on Jul. 21, 1998, now Pat. No. 6,115,174, said application No. 10/032,051 is a continuation-in-part of application No. 09/817,478, filed on Mar. 26, 2001, now Pat. No. 6,839,522, and a continuation-in-part of application No. 09/544,487, filed on Apr. 7, 2000, now Pat. No. 6,282,002, which is a continuation-in-part of application No. 09/119,561, filed on Jul. 21, 1998, now Pat. No. 6,236,487, which is a division of application No. 09/119,556, filed on Jul. 21, 1998, now Pat. No. 6,115,174.

(51) Int. Cl.
    *H04B 10/12* (2006.01)

(52) U.S. Cl. .................................. 359/337.4

(58) Field of Classification Search ............... 359/334, 359/337.4
See application file for complete search history.

(56) References Cited

U.S. PATENT DOCUMENTS

| | | | |
|---|---|---|---|
| 4,315,666 A | 2/1982 | Hicks, Jr. | 385/30 |
| 4,342,499 A | 8/1982 | Hicks, Jr. | 385/30 |
| 4,401,364 A | 8/1983 | Mochizuki | 385/27 |
| 4,616,898 A | 10/1986 | Hicks, Jr. | 385/24 |

(Continued)

FOREIGN PATENT DOCUMENTS

EP   0 734 105 A2   9/1996

(Continued)

OTHER PUBLICATIONS

Kawai et al. Ultra-wide, 75 nm 3 dB gain-band optical amplifier utilising gain-flattened erbium-doped fluoride fibre amplifier and discrete amplification. Electronics Letters. Apr. 30, 1998. vol. 34. No. 9.*

(Continued)

*Primary Examiner*—Deandra M. Hughes

(57) ABSTRACT

Optical systems of the present invention include a plurality of optical processing nodes in optical communication via a plurality of signal varying devices. A first signal varying device includes an optical fiber configured to produce Raman scattering/gain in a signal wavelength range and a first signal variation profile. A first pump source is configured provides sufficient pump power in a plurality of first pump wavelengths to stimulate Raman scattering/gain in the optical fiber within the signal wavelength range. A second signal varying device is provided having a second signal variation profile to produce a cumulative signal variation profile that differs from the first and second signal variation profiles.

17 Claims, 20 Drawing Sheets

U.S. PATENT DOCUMENTS

| | | | |
|---|---|---|---|
| 4,699,452 A | 10/1987 | Mollenauer et al. | 398/157 |
| 4,728,170 A | 3/1988 | Robertson | 385/140 |
| 4,805,977 A | 2/1989 | Tamura et al. | 385/47 |
| 4,881,790 A | 11/1989 | Mollenauer | 398/180 |
| 5,007,705 A | 4/1991 | Morey et al. | 385/12 |
| 5,039,199 A | 8/1991 | Mollenauer et al. | 359/334 |
| 5,050,949 A | 9/1991 | DiGiovanni | 359/337.4 |
| 5,058,974 A | 10/1991 | Mollenauer | 385/27 |
| 5,083,874 A | 1/1992 | Aida et al. | 385/24 |
| 5,095,519 A | 3/1992 | Dorsey | 385/140 |
| 5,191,586 A | 3/1993 | Huber | 372/6 |
| 5,191,628 A | 3/1993 | Byron | 385/27 |
| 5,228,105 A | 7/1993 | Glista | 385/89 |
| 5,283,686 A | 2/1994 | Huber | 359/337 |
| 5,406,411 A | 4/1995 | Button et al. | 359/341.33 |
| 5,500,756 A | 3/1996 | Tsushima et al. | 398/181 |
| 5,500,764 A | 3/1996 | Armitage et al. | 359/341 |
| 5,530,583 A | 6/1996 | Uno et al. | 359/337.4 |
| 5,541,766 A | 7/1996 | Mizrahi et al. | 359/337 |
| 5,557,442 A | 9/1996 | Huber | 359/333 |
| 5,574,589 A * | 11/1996 | Feuer et al. | 398/92 |
| 5,579,143 A | 11/1996 | Huber | 398/72 |
| 5,633,974 A | 5/1997 | Chia | 385/140 |
| 5,636,301 A | 6/1997 | O'Sullivan et al. | 385/24 |
| 5,651,085 A | 7/1997 | Chia | 385/140 |
| 5,673,280 A | 9/1997 | Grubb et al. | 372/3 |
| 5,675,432 A | 10/1997 | Kosaka | 359/337.13 |
| 5,694,512 A | 12/1997 | Gonthier et al. | 385/140 |
| 5,696,615 A | 12/1997 | Alexander | 359/134 |
| 5,717,510 A | 2/1998 | Ishikawa et al. | 359/161 |
| 5,754,320 A | 5/1998 | Watanabe et al. | 359/117 |
| 5,764,406 A | 6/1998 | Newhouse et al. | 359/337.4 |
| 5,784,192 A | 7/1998 | Sugiyama et al. | 359/341 |
| 5,812,710 A | 9/1998 | Sugaya | 385/27 |
| 5,815,299 A | 9/1998 | Bayart et al. | 398/94 |
| 5,818,629 A | 10/1998 | Kinoshita | 359/337.11 |
| 5,861,981 A | 1/1999 | Jabr | 359/337.1 |
| 5,880,866 A | 3/1999 | Stolen | 359/138 |
| 5,883,736 A | 3/1999 | Oshima et al. | 359/341.33 |
| 5,898,714 A | 4/1999 | Morita et al. | 372/6 |
| 5,900,969 A | 5/1999 | Srivastava et al. | 359/341.42 |
| 5,903,371 A | 5/1999 | Arecco et al. | 398/4 |
| 5,903,385 A | 5/1999 | Sugaya et al. | 359/341 |
| 5,920,423 A | 7/1999 | Grubb et al. | 359/341 |
| 5,963,361 A | 10/1999 | Taylor et al. | 359/337 |
| 5,986,799 A | 11/1999 | Itou et al. | 359/337 |
| 5,999,548 A | 12/1999 | Mori et al. | 372/22 |
| 6,031,646 A | 2/2000 | Sniadower | 359/160 |
| 6,038,356 A | 3/2000 | Kerfoot, III et al. | 385/24 |
| 6,055,092 A | 4/2000 | Sugaya et al. | 359/337 |
| 6,057,959 A | 5/2000 | Taylor et al. | 359/341 |
| 6,081,366 A | 6/2000 | Kidorf et al. | 359/341.32 |
| 6,088,152 A * | 7/2000 | Berger et al. | 359/334 |
| 6,115,174 A * | 9/2000 | Grubb et al. | 359/334 |
| 6,122,298 A | 9/2000 | Kerfoot, III et al. | 372/6 |
| 6,163,636 A | 12/2000 | Stentz et al. | 385/24 |
| 6,236,487 B1 | 5/2001 | Stephens | 359/161 |
| 6,274,313 B1 * | 8/2001 | Weeks et al. | 435/6 |
| 6,275,313 B1 * | 8/2001 | Denkin et al. | 398/9 |
| 6,282,002 B1 * | 8/2001 | Grubb et al. | 398/157 |
| 6,344,925 B1 | 2/2002 | Grubb et al. | 359/345 |
| 6,377,389 B1 * | 4/2002 | Grubb et al. | 359/334 |
| 6,381,064 B1 | 4/2002 | Terahara | 359/341.41 |
| 6,775,056 B1 * | 8/2004 | Grubb et al. | 359/337.4 |
| 6,839,522 B1 * | 1/2005 | Grubb et al. | 398/158 |

FOREIGN PATENT DOCUMENTS

| | | |
|---|---|---|
| EP | 0853396 A2 | 7/1998 |
| JP | 07202306 A | 8/1995 |
| WO | WO 98/20587 | 5/1998 |
| WO | WO 98/42088 | 9/1998 |
| WO | WO 99/43107 | 8/1999 |

OTHER PUBLICATIONS

Aida, et al., Design and Performance of a Long-Span IM/DD Optical Transmission System Using Remotely Pumped Optical Amplifiers, IEE Proceedings, vol. 137, Pt. J, No. 4, Aug. 1990, pp 225-229.

Aida, K., et al., Long-Span Repeaterless IM/DD Optical Transmission Experiment Over 300 KM Using Optical Amplifiers, ICC '91, vol. 3, 1991, Published: New York, NY, USA, pp. 1228-1232.

Chernikov, S.V., et al., 10 Gbit/s Error-Free Transmission of 2-ps Pulses Over A 45-km Span Using Distributed Raman Amplification at 1300 nm, OFC'98 Technical Digest p. 31.

Dessurvire, E., Lightwave Communications: The Fifth Generation, Scientific American, Jan., 1992, pp 114-121.

Dianov, E.M., et al., Highly Efficient 1.3 µm Raman Amplifier, OFC'98 Technical Digest pp. 33-34.

Dung, J.C., et al., Gain Flattening of Erbium Doped Fibre Amplifier Using Fibre Bragg Gratings, Electronics Letters, Mar. 19, 1998, vol. 34, No. 6., Online No. 19980446.

Grubb, S.G., Raman Amplifiers for Broadband Communications, OFC '98, OSA Technical Digest Series vol. 2, 1998, abstract.

Hansen, P.B., et al., Loss Compensation in Dispersion Compensating Fiber Modules by Raman Amplification, OFC'98 Technical Digest pp. 20-21.

Jacobovitz-Veselka, G.R., et al., Single-Stage Booster Amplifier With Two 980 nm Pumps Stabilized by Fiber Gratings, Optical Amplifiers and their Application, Jun. 15-17, 1995, 1995 OSA Technical Digest Series, V18, pp. FC4-1-4/162-165.

Kawai, S., et al., Ultrawide 75 nm 3-dB Gain-Band Optical Amplifier Utilizing Erbium-Doped Fluoride Fiber and Raman Fiber, OFC'98 Technical Digest pp. 32-33.

Kidorf, H., et al., Pump Interactions in a 100-NM Bandwidth Raman Amplifier, IEEE Photonics Technology Letters, vol. 11, No. 5, May 1, 1999, pp. 530-532.

Ma, et al., 240-KM Repeater Spacing in a 5280-KM WDM System Experiment Using 8 X 2.5 gb/s NRZ Transmission, IEEE Photonics Technology Letters, vol. 10, No. 6, Jun. 1998, pp 893-5.

Masuda, et al., 75-NM 3dB Gain-Band Optical Amplification With Erbium-Doped Fluoride Fibre Amplifiers and Distributed Raman Amplifiers in 9 X 2.5 gb/s WDM Transmission Experiment, ECOC 1997, Publication No. 448, vol. 5, Sep. 25, 1997, pp. 73-76.

Masuda, H., et al., Ultra-Wideband Hybrid Amplifier Comprising Distributed Raman Amplifier and Erbium-Doped Fiber Amplifier, Electronics Letters, Jun. 25, 1998, vol. 34, No. 13, Online No. 19980935.

Masuda, H., et al., Ultra-Wideband Optical Amplification With a 3-dB Bandwidth of 67 nm Using a Partially Gain Flattened Erbium-Doped Fiber Amplifier and Raman Amplification, Optical Amplifiers and their Application, Aug. 3-5, 1994, 1997 OSA Technical Digest Series, V20, pp. MC3-1-4/40-3.

Park, S.Y., et al., Feasibility Demonstration of 10 Gbit/s Channel WDM Network Using Dynamic Gain-Controlled EDFAs, Electronics Letters, Mar. 5, 1998, vol. 34, No. 5., Online No. 19980346.

Rottwitt, K., et al., A 92 nm Bandwidth Raman Amplifier, OFC'98, Post-Deadline Paper PD6-1-4.

Rottwitt, K., et al., Detailed Analysis of Raman Amplifiers for Long-Haul Transmission, OFC'98 Technical Digest pp. 30-31.

Srivastava, A. K., et al., 1 Tb/s Transmission of 100 WDM 10 Gb/s Channels Over 400 km of TrueWave FIBER, OFC'98, Post-Deadline Paper PD10-1-4.

Stentz, A., et al., OSA Trends in Optics and Photonics, vol. 5, Optical Amplifiers and Their Applications. From the Topical Meeting, pp. 350-368, Published: Washington, DC, USA, 1996.

Sugaya, Y., et al., Novel Configuration for Low-Noise and Wide-Dynamic-Range Er-Doped Fiber Amplifiers for WDM Systems, Optical Amplifiers and their Application, Jun. 15-17, 1995, 1995 OSA Technical Digest Series, V18, pp. FC3-1-4/158-161.

Takano, K., et al., An Optical Pre-Amplifier With Automatic Gain Control Function, Proceedings of the 1995 IEICE General Conference, Mar. 27-30, 1995, Fukuoka, Fukuoka Institute of Technology b-1067, p. 513.

Wen, S., et al., IEEE Phontonics Technology Letters, Feb. 1992, vol. 4, No. 2, New York, US, pp. 189-192, IEEE Log No.: 9105789.

Yu, A., et al., Analysis of Optical Gain and Noise Spectral Properties of Erbium-Doped Fiber Amplifier Cascade, Optical Amplifiers and their Application, Aug. 3-5, 1994, 1994 OSA Technical Digest Series, V14, pp. FB1-1-3/124-126.

Zou et al., Compensation of Raman Scattering and EDFA's Nonuniform Gain in Ultra-Long-Distance WDM Links, IEEE Photonics Technology Letters, vol. 8, No. 1, Jan. 1996, pp. 139-141.

International Preliminary Examiniation Report for PCT/US00/04286.

Written Opinion for PCT/US00/04286.

International Search Report for PCT/US00/04286.

Supplementary European Search Report for EP 00 91 7647.

International Search Report for PCT/US99/16487.

International Search Report for PCT/US99/16486.

Communication Pursuant to Article 96(2) for EP 00 917 647.

* cited by examiner

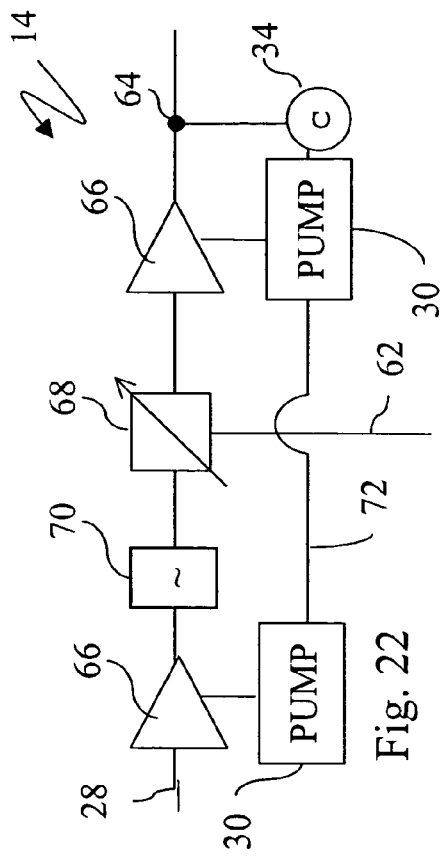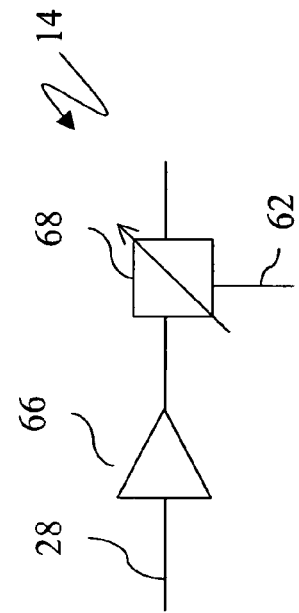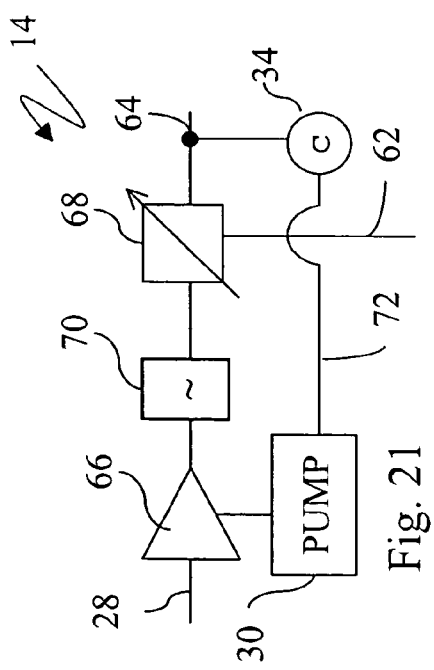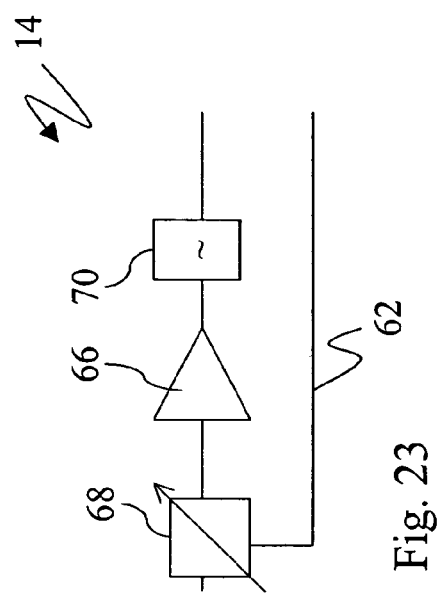
Fig. 21
Fig. 22
Fig. 23
Fig. 24

OPTICAL TRANSMISSION SYSTEMS INCLUDING SIGNAL VARYING DEVICES AND METHODS

CROSS-REFERENCE TO RELATED APPLICATIONS

This application is a continuation of U.S. patent application Ser. No. 10/032,051, filed Dec. 21, 2001 now U.S. Pat. No. 6,775,056, which is a continuation in part of U.S. patent application Ser. No. 09/253,819, filed Feb. 19, 1999 now U.S. Pat. No. 6,344,922, which is a continuation in part of U.S. patent application Ser. No. 09/119,556, filed Jul. 21, 1998, now U.S. Pat. No. 6,115,174, issued Sep. 5, 2000; and U.S. patent application Ser. No 10/032,051, filed Dec. 21, 2001 now U.S. Pat. No. 6,775,056 is a continuation in part of U.S. patent application Ser. No. 09/817,478, filed Mar. 26, 2001 now U.S. Pat. No. 6,839,522, which is a continuation in part of U.S. patent application Ser. No. 09/119,561, filed on Jul. 21, 1998, now U.S. Pat. No. 6,236,487, issued May 22, 2001, and U.S. patent application Ser. No. 09/817,478 is also a continuation in part of U.S. patent application Ser. No. 09/544,487, filed on Apr. 7, 2000, now U.S. Pat. No. 6,282,002, issued Aug. 28, 2001, which is a divisional application of U.S. patent application Ser. No. 09/119,556, filed Jul. 21, 1998, now U.S. Pat. No. 6,115,174, issued Sep. 5, 2000, all of which are incorporated herein by reference.

BACKGROUND OF THE INVENTION

The continued development of digital technology has provided electronic access to vast amounts of information. The increased access to information has fueled an increasing desire to quickly obtain and process the information. This desire has, in turn, driven demand for faster and higher capacity electronic information processing equipment (computers) and transmission networks and systems linking the processing equipment (telephone lines, cable television (CATV) systems, local, wide and metropolitan area networks (LAN, WAN, and MAN)).

In response to this demand, telecommunications companies have turned to optical communication systems to provide substantially larger information bandwidth transmission capacities than traditional electrical communication systems. Early optical transmission systems, known as space division multiplex (SDM) systems, transmitted one information signal using a single wavelength in a waveguide, i.e. fiber optic strand. Time division multiplexing (TDM) multiple information signals onto a single wavelength in a known sequence that can be separated upon receipt has further increased the transmission capacity of optical systems.

The continued growth in traditional communications systems and the emergence of the Internet as a means for accessing data has further accelerated the demand for higher capacity communications networks. Telecommunications companies have looked to wavelength division multiplexing (WDM) to further increase the capacity of their existing systems. In WDM transmission systems, pluralities of distinct TDM or SDM information signals are carried using electromagnetic waves having different wavelengths. The pluralities of information carrying wavelengths are combined into a multiple wavelength signal, which is transmitted in a single waveguide. In this manner, WDM systems can increase the transmission capacity of existing SDM/TDM systems by a factor equal to the number of wavelengths used in the WDM system.

Optical WDM systems were not initially deployed, in part, because high cost electrical signal regeneration/amplification equipment was required for each optical wavelength throughout the system. However, the development of the erbium doped fiber optical amplifier (EDFA) eliminated the need for electrical signal regeneration/amplification equipment and the associated costs in many systems, thereby making WDM a cost effective means to increase network capacity.

Erbium doped fiber amplifiers ("EDFAs") can theoretically be used to amplify signals in an amplification wavelength range spanning from approximately 1500 nm to 1600 nm. However, EDFAs do not equally amplify each optical signal wavelength within the range. The differences in amplification can result in attenuation of some signals and/or signal loss or distortion because of highly amplified noise. Thus, the performance of EDFAs in a transmission system varies depending upon the number of wavelengths and the wavelengths used in the system.

Judicious selection of the wavelengths and amplifier powers used in a system can minimize EDFA variations (gain non-uniformities). For example, many WDM systems currently restrict the wavelengths used in the system to between 1540 nm and 1560 nm, a range in which EDFAs comparably amplify optical signals. As might be expected, restricting system designs to only those wavelengths that are comparably amplified by EDFAs severely limits the number of wavelengths and the information transmission capacity of WDM systems.

The number of wavelengths in the system can be increased to some extent, if only a small number of amplifiers are used in the system. The small number of amplifiers allows wavelengths having differing EDFA amplification characteristics to be used, because the cumulative amplifier variations do not swamp out lowly amplified signals.

In addition to the wavelength dependence, EDFA performance is also a function of the amplification power supplied to the EDFA. Thus, EDFAs generally must be operated with a limited power range to minimize amplification variations in the system. The amplifier power limitations, in turn, increase the number of amplifiers in a system by limiting the allowable distance between EDFAs, i.e., the span length.

In discussing the signal intensity variation of EDFAs and other devices, the uniformity of gain or loss profiles over a wavelength range is generally referred to as the flatness of the profile. A perfectly flat profile is a gain, loss, or transparency profile that has a constant value over the wavelength range of interest.

WDM system constraints imposed by EDFA wavelength variations have focused attention on providing EDFA configurations that compensate for the variations and provide more uniform gain for a larger band of wavelengths and over a greater power range. Various EDFA configurations have been proposed to minimize amplifier gain variations. For example, see U.S. Pat. Nos. 5,406,411, 5,541,766, 5,557, 442, 5,636,301, and 5,696,615; Sugaya et al., Optical Amplifiers and Their Applications, Technical Digest OSA 1995 v. 18, pp. 158–161/FC3-1; Jacobovitz-Veselka et al., Optical Amplifiers and Their Applications, Technical Digest OSA 1995 v. 18, pp. 162–165/FC3-1; Park et al., Electronics Letters, Mar. 5, 1998, Vol. 34, No. 5, Online No. 19980346; and, Dung et al., Electronics Letters, 19 Mar. 1998, v. 34, n. 6, Online No. 19980446.

Other amplifier configurations have used EDFAs in combination with a Raman amplifier to statically vary the gain profile of an EDFA. For example, see Masuda et al., OSA 1997, pp. 40–3/MC3-1, Masuda et al., Electronics Letters, v34, n13, Online No. 19980935 (Jun. 25, 1998), and U.S. Pat. No. 5,083,874 issued to Aida et al. It has also been proposed to eliminate EDFAs and use amplifier configurations that employ only Raman amplifiers. However, the all-Raman configurations to date have not greatly improved the amplifiers gain flatness profile and may still require gain equalization to flatten the gain profile as discussed by Rottwitt et al., "A 92 nm Bandwidth Raman Amplifier", OFC '98, p. 72/CAT-1.

The above referenced gain flattened configurations are generally statically configured to have a wavelength range defined by a 3 dB variation (~a factor of 2) in the gain profile and having a ±1 dB variation between wavelengths. The gain flattened amplifiers provide some improvement over conventional EDFAs in the number of amplifiers, amplifier power ranges, and span lengths before the signal must be regenerated. The gain flattened optical amplifiers nonetheless introduce excess amplifier noise and gain nonuniformities that limit the number of optical amplifiers that can be used in a WDM system prior to signal regeneration.

Gain flattening in optical amplifier configurations is generally performed using filters and/or attenuators to decrease the signal intensity of the wavelengths to a specified value. For example, in many embodiments, the optical signals are amplified to an intensity higher than the amplifier output value and the filters and attenuators are used to flatten the gain profile by decreasing the optical signal intensity. These methods tend to increase the noise in the signal with a corresponding decrease in the output power of the device.

Optical filters and attenuators can be separate optical devices added to the system or all-fiber devices, such as Bragg grating filters and all-fiber attenuators as discussed in U.S. Pat. Nos. 4,728,170, 5,095,519, 5,633,974, 5,651,085, and 5,694,512. The filters and attenuators can be variable or fixed depending upon the configuration. The amplifier, filters, and attenuators are configured statically to flatten the gain profile.

As the demand for transmission capacity continues to increase, there is an increasing need for systems that cover longer distances and provide for an increasing number of information carrying wavelengths/channels. Thus far, it has proven difficult to balance the non-linear gain of EDFA configurations with selective wavelength filtering and attenuation to provide gain flattened amplifier configurations that meet this need.

Accordingly, there is a need for signal varying devices generally, and optical amplifiers and attenuators particularly, that provide increased control over the intensity profile of optical signal in the optical systems. The improved signal varying devices will provide for higher capacity, more versatile, longer distance communication systems.

BRIEF SUMMARY OF THE INVENTION

The apparatuses and methods of the present invention address the above difficulties with prior art optical devices and systems. An optical system of the present invention includes a plurality of optical processing nodes in optical communication via at least one signal varying device. The signal varying device includes an optical fiber suitable for facilitating Raman scattering/gain in a signal wavelength range and a pump power source for providing pump power in a plurality of pump wavelengths. The pump source provides sufficient pump power in each pump wavelength to stimulate Raman scattering/gain in the optical fiber within the signal wavelength range.

The signal varying device may be embodied as a distributed device that employs a portion or all of an optical transmission fiber extending between two optical nodes, such as between an optical transmitter and an optical receiver. The signal varying device may also be embodied as a lumped or concentrated device that is placed in the optical transmission fiber at discrete locations between the optical nodes.

The pump wavelengths are selected such that the combined Raman gain resulting from the pump power supplied by each pump wavelength produces a desired signal variation profile in the signal wavelength range. In addition, the pump power supplied by at least one of the pump wavelengths may be dynamically varied to produce a controlled signal intensity variation profile over the signal wavelength range in the optical fiber. In an embodiment, four pump wavelengths spaced in 10–30 nm intervals may be used to provide intensity gain and flatness control to over 30 nm to within ±0.2 dB.

Also in an embodiment, erbium doped fiber is included in the signal varying device to provide a multiple stage signal varying device. The erbium doped fiber and the multiple wavelength controlled Raman portion of the signal varying device may be operated in conjunction to impart a desired intensity profile to the optical signal.

The design and length of the optical fiber used in conjunction with the pump source may be tailored to provide flexibility in operation of the system. For example, a concentrated, or lumped, high gain signal varying device may be provided using a small core fiber, such as dispersion compensated or dispersion shifted fiber. The lumped device further provides for a greater range over which the signal varying device may be used as an attenuator because of its higher localized loss.

Multistage concentrated and/or distributed Raman signal varying devices may also be employed to further tailor the profile using either separate or common pump sources. For example, a first concentrated Raman stage may employ small core fiber to provide for efficient Raman amplification of the signal wavelengths. A second concentrated Raman stage may employ a larger core fiber to further amplify the signal power, while lessening the extent of non-linear interactions amongst the signal wavelengths that may occur in a single stage with smaller core fibers. The second concentrated Raman stage may also employ fiber having low loss in the 1400–1520 nm range to allow for more efficient Raman pumping of the multiple stages using a common source. In addition, the first and second Raman stages may use fibers that have different chromatic dispersion characteristics to further reduce the extent of non-linear interaction between the signal wavelengths.

Distributed signal varying devices may be provided by employing the optical transmission fiber spanning between the optical nodes to control the signal variation profile occurring in the transmission fiber. Also, different optical fiber types, including doped fibers, may be used in various portions to replace existing transmission fiber to provide for different distributed signal varying profiles. The concentrated and distributed Raman signal varying devices may be used alone or in combination to statically or dynamically impart desired signal varying profile characteristics to the system.

In an embodiment, a distributed Raman amplifier may be employed with one or more first pump sources propagating pump power in the transmission fiber to amplify counter-propagating signal wavelengths to provide a first signal varying profile. A concentrated Raman signal varying device may be placed in series with the distributed Raman amplifier employing one or more second pump sources to provide a second signal varying profile. The first and second signal varying profiles acting to produce a desired overall signal varying profile. Additionally, an EDFA may be employed to contribute a third signal varying profile to the overall signal varying profile.

A distributed Raman amplifier may also be used to provide pump power to one or more remotely located concentrated or distributed Raman amplifiers and/or doped amplifying fibers. For example, the pump sources may be selected to produce a first signal varying profile in the distributed Raman amplifier and a second signal varying profile in the remotely located erbium doped fiber. The pump power and/or the wavelength of the pump power sources may be varied to control to individual and overall signal varying profiles. Pump power may also be supplied to remotely located signal varying devices using one or more separate fibers. Such fibers may be pure $SiO_2$ to minimize loss and nonlinear conversion of the pump light.

Additional gain and gain profile control in Raman amplifier stages may be produced by including one or more pumps at lower Raman wavelengths that serve to provide additional pump power to the higher Raman pump wavelengths. The pump source may employ numerous configurations to decrease the extent of interference, i.e., cross-talk, that occurs between the Raman pump wavelengths, as well as the signal wavelength.

Thus, the devices and methods of the present invention provide for control of the signal intensity over a range of wavelengths in optical transmission systems. Accordingly, the present invention addresses the aforementioned problems and provides signal varying devices, methods, and optical systems that provide increased control over optical signal characteristics in the system. These advantages and others will become apparent from the following detailed description.

BRIEF DESCRIPTION OF THE DRAWINGS

Embodiments of the present invention will now be described, by way of example only, and not for the purposes of limiting the invention, wherein:

FIGS. 21–29 illustrate several embodiments of the signal varying device.

DETAILED DESCRIPTION OF THE INVENTION

Figure 1:
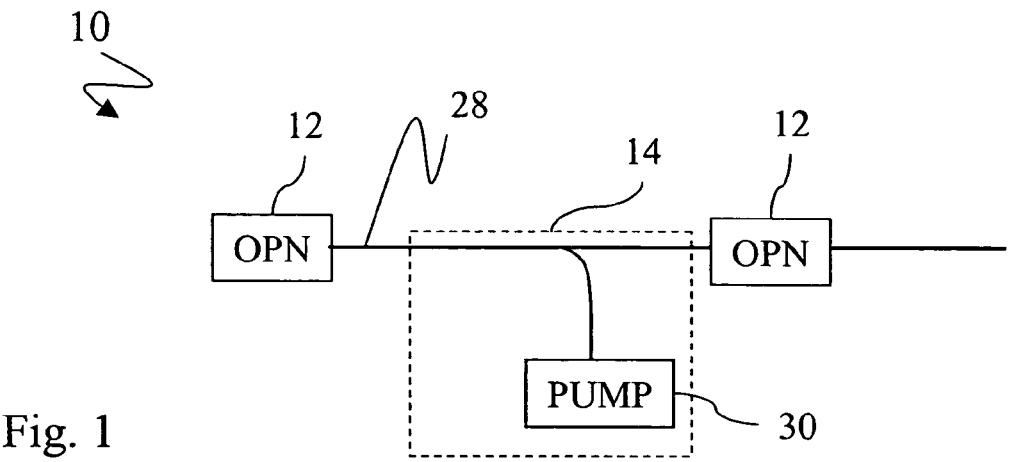
FIGS. 1–2 illustrate embodiments of optical communication systems of the present invention.
Figure 2:
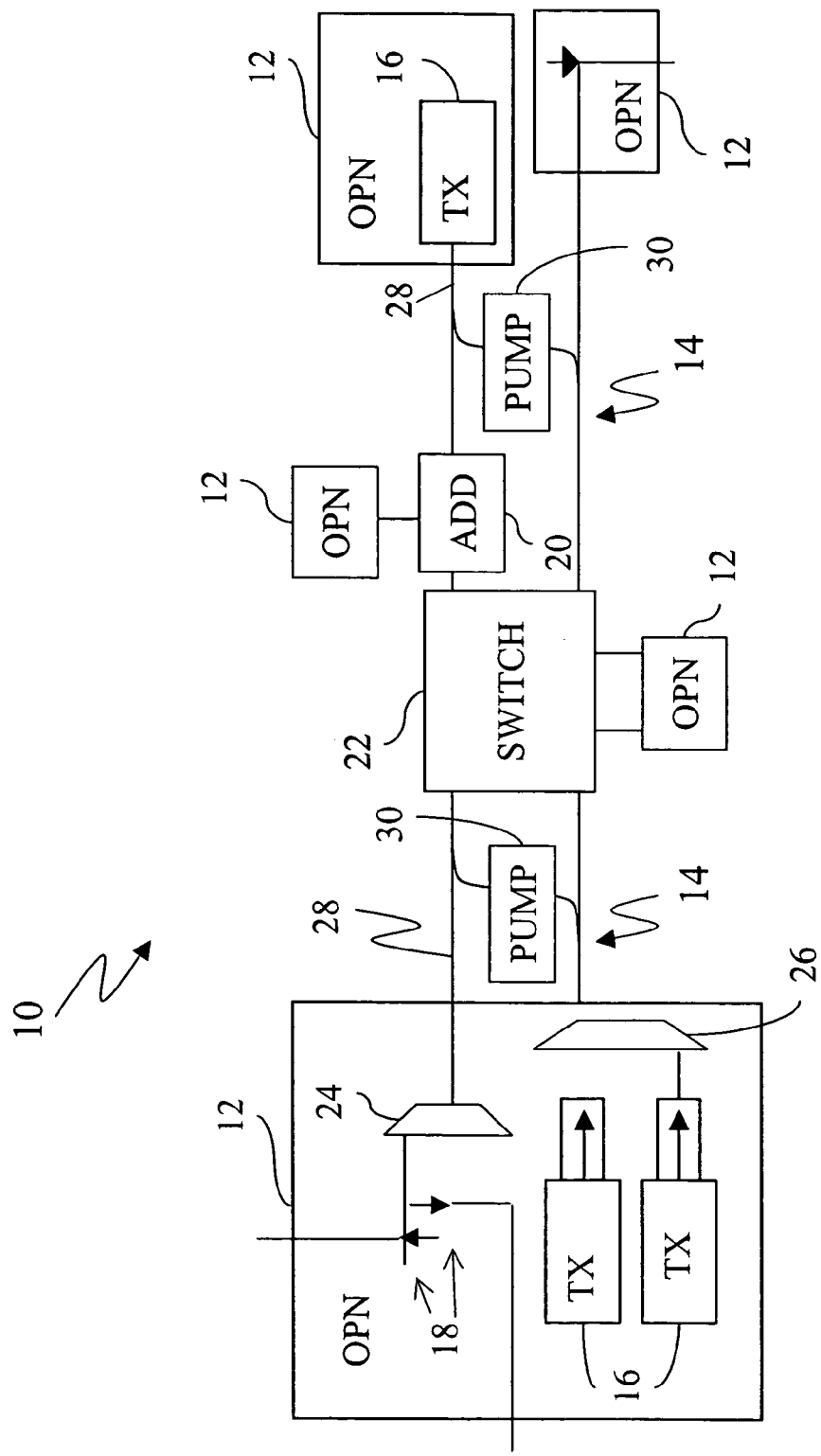

FIGS. 1 and 2 illustrate embodiments of optical systems 10 including optical processing nodes 12 and signal varying devices 14. The system 10 may include one or more signal varying devices 14, which may be the same or different and which may be operated individually or in one or more groups. The system 10 may be embodied, for example, as one or more point to point links, as one or more rings, as a mesh architecture, or in one or more other system 10 architectures.

The optical processing nodes 12 can include one or more optical processing devices, such as transmitters 16, receivers 18, add and/or drop devices 20, switches 22, signal splitters 24 and combiners 26, or other signal processing devices. The optical processing nodes 12 may serve as terminals in the optical system 10 or may be disposed intermediately along optical transmission fiber 28.

The signal varying devices 14 may include one or more amplifiers, attenuators, filters, and other devices for varying optical signals, and can include doped or undoped fiber 28 in optical communication with the processing nodes 12 and can include or be connected to one or more pump sources 30. The device 14 can be used in combination with linear and/or nonlinear or nonlinearly operated components, such as one or more rare Earth doped fiber amplifiers, to produce net linear intensity profiles and/or non-linear profiles. The signal varying devices 14 can also utilize other types of gain, such as Raman gain, as well as combinations of gain types. Although the present invention will be described in terms of signal varying devices 14 connected between optical processing nodes 12, the present invention also includes signal varying devices 14 located within optical processing nodes 12.

The signal varying devices 14 may be operated in one or more signal varying modes, including amplification, attenuation, and lossless transmission. By controlling the power of the pump 30, one signal varying device 14 may be operated or transitioned between the modes of operation. The gain/loss profile of each signal varying device 14 may be adjusted to control the characteristics of the optical signals passing through that device 14. The signal varying devices 14 may also be operated in more than one mode at the same time. For example, a signal varying device 14 may be operated as an amplifier over part of the signal wavelength range and as an attenuator over the remaining part of the signal wavelength range. The multiple mode operation of the signal varying device 14 may be used, for example, to compensate for optical signals that enter the signal varying device 14 with undesired characteristics, such as a non-linear intensity profile. Unlike prior art systems, the present invention does not require that a number of non-linear devices be coordinated and controlled to provide linear intensity profiles. Instead, the present invention can provide an optical system 10 incorporating a continuous transition signal varying device 14 that provides increased control over the characteristics of optical signals being transmitted in the system 10.

The signal varying devices 14 may include single or multiple stages, may be used alone or in groups, and may be operated with various signal variation profiles, pump wavelengths, pump wavelength spacing, pump powers, etc., such as to provide a cumulative signal variation profiles differing from the signal variation profiles of each device 14. Signal variation profiles may be varied, such as by varying the pump wavelengths in different devices 14, to compensate for individual signal variation profile non-uniformities and provide a cumulative signal variation profile that is substantially more uniform or otherwise more desirable than the individual device profiles.

The signal varying device 14 may be embodied as a distributed device, such as with Raman gain transmission fiber including a substantial portion or all of the optical transmission fiber 28 extending between nodes 12 and/or signal varying devices 14. The signal varying device 14 may also be embodied as a lumped (or concentrated) device that is placed in the optical transmission fiber 28 at discrete locations using, for example, Raman amplifiers or Erbium doped fiber amplifiers. Concentrated devices 14 may be constructed, for example, by winding optical fiber of sufficient length to provide the desired signal variation range, such as amplification, at a discrete location to control the size of the devices 14.

The signal varying devices 14 provide flexibility in the control of the optical system 10, because the power level (e.g., amplification and/or attenuation level) may be varied without changing the signal varying profile. The signal varying devices 14 may be controlled individually, or they may be controlled as one or more groups to provide additional stability in the system 10. Examples of such optical control systems are disclosed hereinbelow.

The fiber 28 in the signal varying device 14 can be selected to facilitate Raman scattering/gain or be doped, such as with a rare earth element like Erbium, Ytterbium, other rare earth elements, and combinations of dopants, which facilitate signal amplification when pumped. Most silica-based fiber, including most transmission fibers, facilitate Raman gain in a wide range of wavelengths.

The fiber 28 used in the signal varying device 14 may be the same as the transmission fiber 28 in the system 10, or it may be another type of fiber having properties that differ from the transmission fiber in the system 10. The length and type of fiber can be tailored to provide flexibility in the operation of the system. For example, the extent of Raman scattering in the fiber is partly dependent upon the size of the fiber core. In addition, the loss in the fiber increases as the size of the core decreases. Thus, a concentrated (or lumped) high gain/loss signal varying device can be provided using a small core fiber. Also, some fiber core composition, such as cores with increased germania concentrations, may provide for wider Raman gain variation profiles. In addition, fibers may be chosen to impart other characteristics, i.e., chromatic dispersion, to the optical signals that may differ from those of the transmission fiber. For example, the fiber 28 in the signal varying device 14 may be, for example, small core dispersion compensated fiber ("DCF"), such as is manufactured by Lucent Technologies, Corning Incorporated, and Sumitomo Electric Company, and may be used to produce a concentrated gain/loss. The DCF concentrated device provides for a greater range over which the signal varying device can be used as an attenuator, an amplifier, or a transparent link, because of the high attenuation/high gain properties of the DCF. Conversely, a distributed low gain/loss arrangement can be provided using a lower attenuation transmission fiber, and will provide for signal variation over a smaller variation (gain/loss) range.

The pump source 30 provides pump power to the fiber 28 in one or more pump wavelengths at one or more points along the fiber 28. The pump sources 30 may include, for example, one or more lasers, light emitting diodes, grating stabilized lasers, and other coherent or incoherent, narrow band or broadband sources. It is often desirable to select pump wavelengths so that the pump power supplied by each pump wavelength is relatively uniform (e.g., within ±10% of the average pump power per pump wavelength).

The pump power can be supplied to the fiber 28 counter-directionally and/or codirectionally with the direction of the travel of the optical signals being transmitted in the system 10. For example, information may be transmitted in one direction at 1450 nm and pump power supplied at the same wavelength for Raman gain in the 1550 range in the other direction. When allocating the same wavelength for use in both directions, consideration must be given to potential signal degradation, such as due to Rayleigh back-scattering. Counter directional pumping tends to lessen pump and signal-pump separation complexity and interference between the pump power and the optical signal.

Figure 3A:
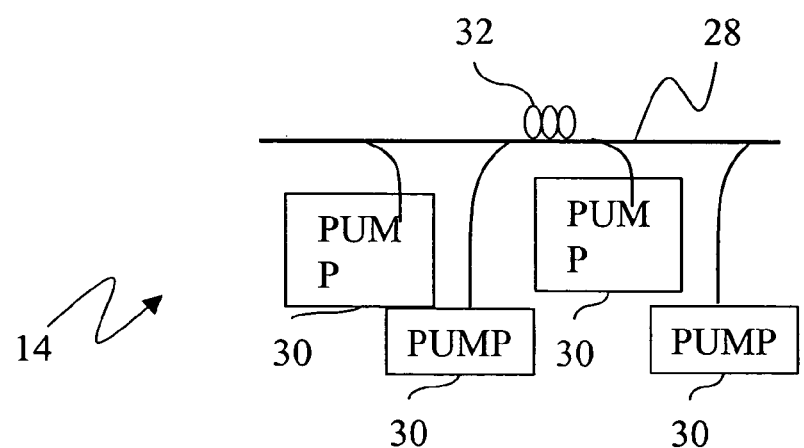
FIGS. 3–7 illustrate signal varying devices of the present invention.

FIG. 3a illustrates a multi-stage signal varying device 14 including Erbium doped fiber 32 and both EDFA and Raman amplifiers. In that embodiment, EDFA and Raman amplification is accomplished by both counter pumping and co-pumping the EDFA and Raman amplifiers at several points along the fiber 28. In other embodiments, only counter pumping, only co-pumping, or other combinations thereof can be used. In another embodiment, the signal varying device 14 can include fiber 32 doped with materials other than Erbium, such as Ytterbium, other rare earth elements, and combinations thereof.

Figure 3B:
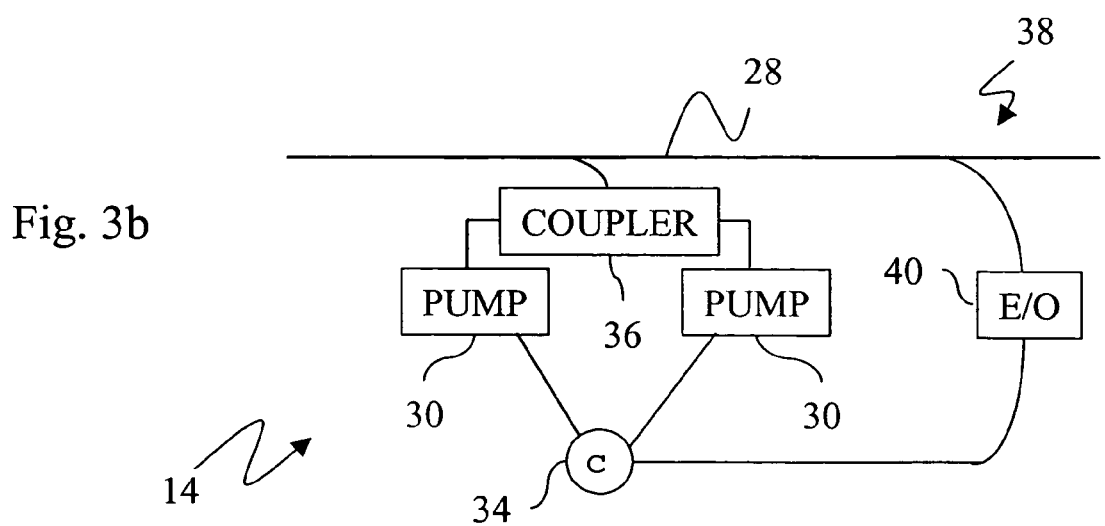

FIG. 3b illustrates another embodiment of the signal varying device 14 including a controller 34 and a pump coupler 36. The controller 34 monitors one or more characteristics of the optical signals in the fiber 28 and controls the device 14, such as by controlling the pump power supplied via one or more of the pump sources 30. The controller 34 can also be used to control devices other than amplifiers, such as variable attenuators and filters. The controller 34 can be connected to the fiber 28, such as via an optical tap 38 and an electrical to optical converter 40, or via another device, such as a receiver 18 or other device in an optical processing node 12. The controller 34 can monitor the signals on an individual wavelength basis or in one or more groups of wavelengths. The controller 34 can use one or more devices to monitor the wavelengths, such as optical spectrum analyzers, tunable receivers, error rate test devices, etc.

The controller 34 can provide for dynamic control over the signal varying devices 14, such as to compensate for variations in environmental conditions or in the system 10. Typical system 10 variations include the number of wavelengths/channels being used in the system 10, signal processing occurring at the processing nodes 12, replacement or degradation of system components, failures in the system, etc. The controller 34 also allows the signal varying devices 14 to be roughly calibrated prior to insertion into the system 10, and then to be dynamically adjusted under the actual operating conditions of the system 10 to provide the desired performance.

One form of control that can be exercised by the controller 34 is control of the pump sources 30, which allow for the performance of the device 14 to be varied, such as when signal transmission changes occur upstream or downstream of the device 14. Thus, the control provides the ability to continually or periodic modify the operation of the devices 14 in response to environmental or system 10 variations. For example, the performance of the device 14 can be varied so as to maintain a gain profile, to change to a different gain profile, to compensate for changes in the system 10, to maintain a minimum signal to noise ratio, etc. In one embodiment, the device 14 can be set to maintain a uniform gain profile and then to periodically monitor its performance and make appropriate adjustments as required, such as to vary the pump power to compensate for variations in the total signal power.

The pump coupler 36 combines two or more pump wavelengths and can include one or more devices, such as fused couplers, DWDM couplers, polarization combiners, polarization maintaining couplers, dichroic devices, etc. The pump coupler can be polarization sensitive or polarization insensitive, and may or may not be polarization maintaining. The pump coupler 36 can be used, for example, to combine pump wavelengths so that the combined signals have polarizations that are orthogonal to each other. The use of polarization sensitive couplers provides additional control over the pump power polarization and the resulting pump power conversion in the Raman amplifiers. The combination of different types of pump couplers 36 in the present invention provides increased flexibility in wavelength combining and amplifier gain profile control.

Figure 4:
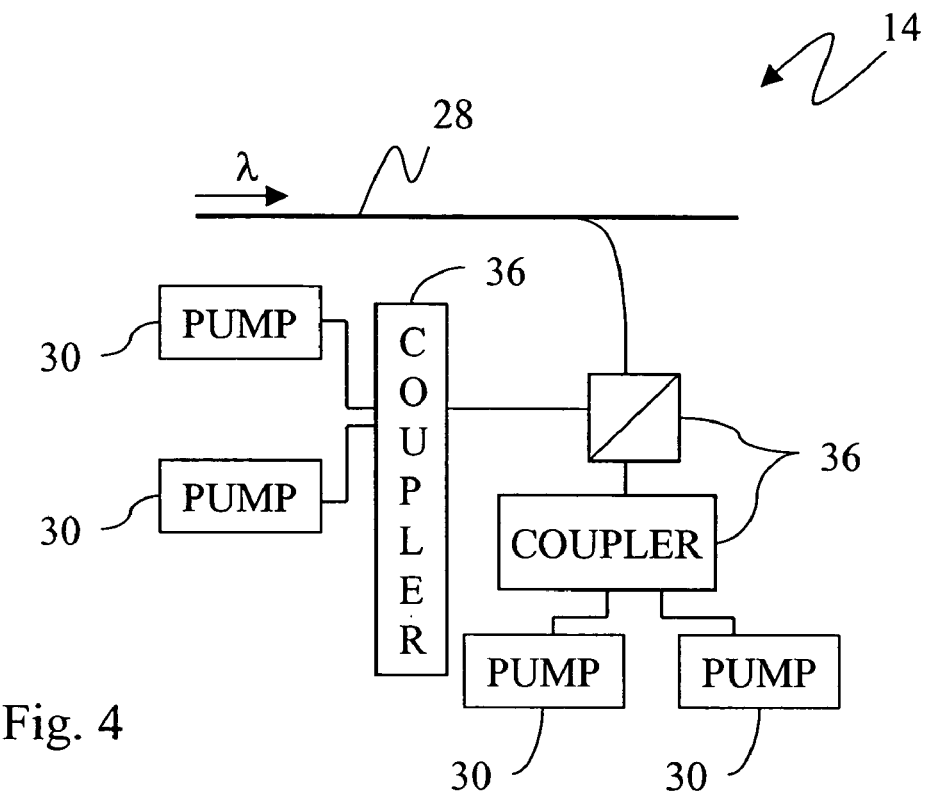

FIG. 4 illustrates another embodiment of the signal varying device 14 which is configured to combine pump wavelengths using cascaded pump couplers 36. In that embodiment, the signal varying device 14 combines four pump wavelengths (e.g., 1450, 1460, 1485, and 1495 nm), using three couplers (e.g., two 10 nm DWDM couplers and a dichroic filter), effectively combining the unevenly spaced pump wavelengths. The combined pump wavelengths may be supplied, for example, to dispersion compensating fiber to provide Raman gain in the transmission signal wavelength range of 1555 to 1585 nm.

Figure 5:
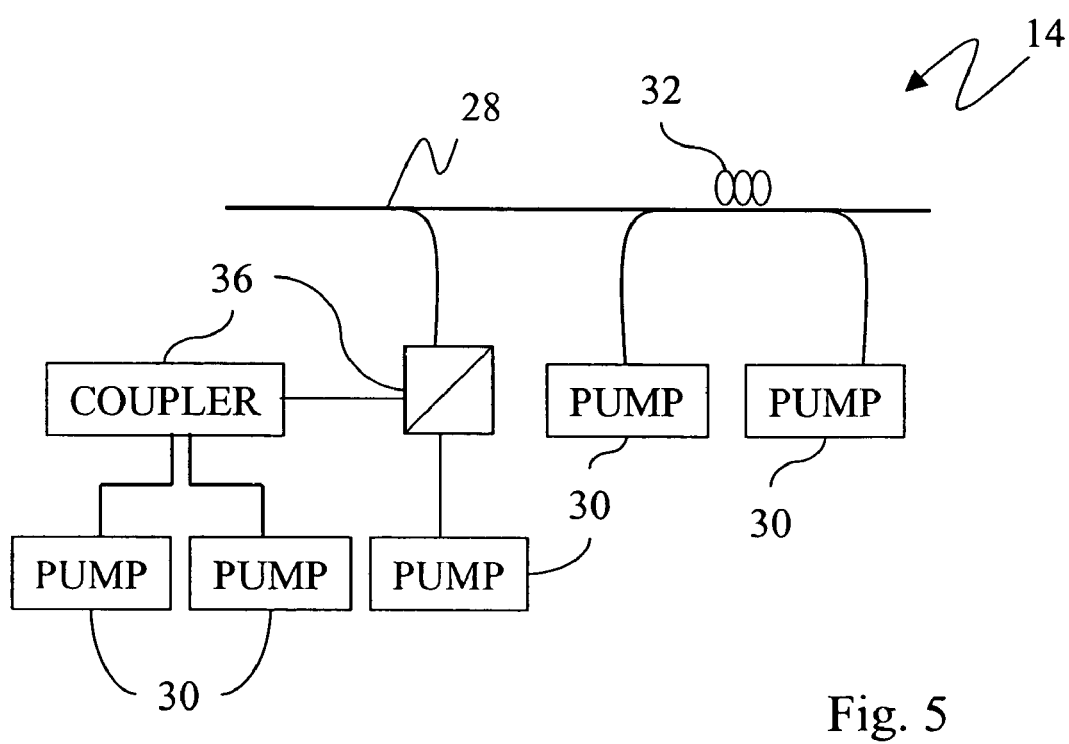

FIG. 5 illustrates multiple stage signal varying device 14 having a Raman stage and an Erbium doped stage. The pump wavelengths used in erbium fiber 32 stages of the device 14 may be selected to provide pump power, for example, in the 980 nm range for only Erbium gain or in the 1480 nm range for both Raman and Erbium gain. Pump wavelengths in the 980 nm range may also be used to pump successive Raman Stokes orders in the device 14, as discussed herein.

Figure 6:
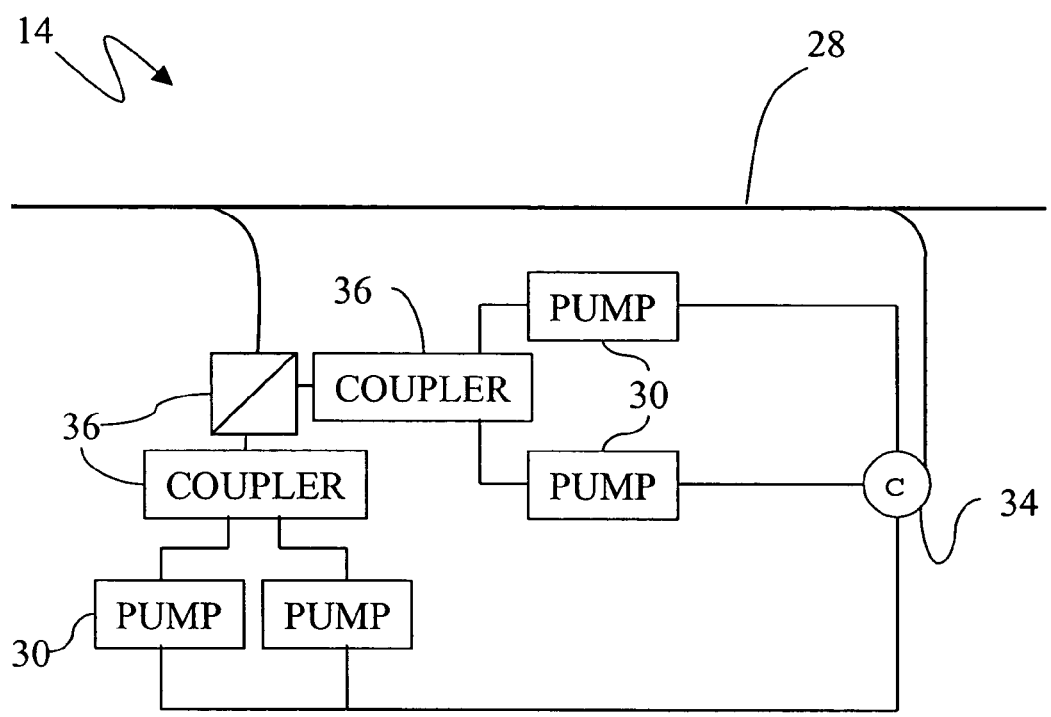

FIG. 6 illustrates another embodiment of a signal varying device 14 including a controller 34 and pump couplers 36.

Figure 7A:
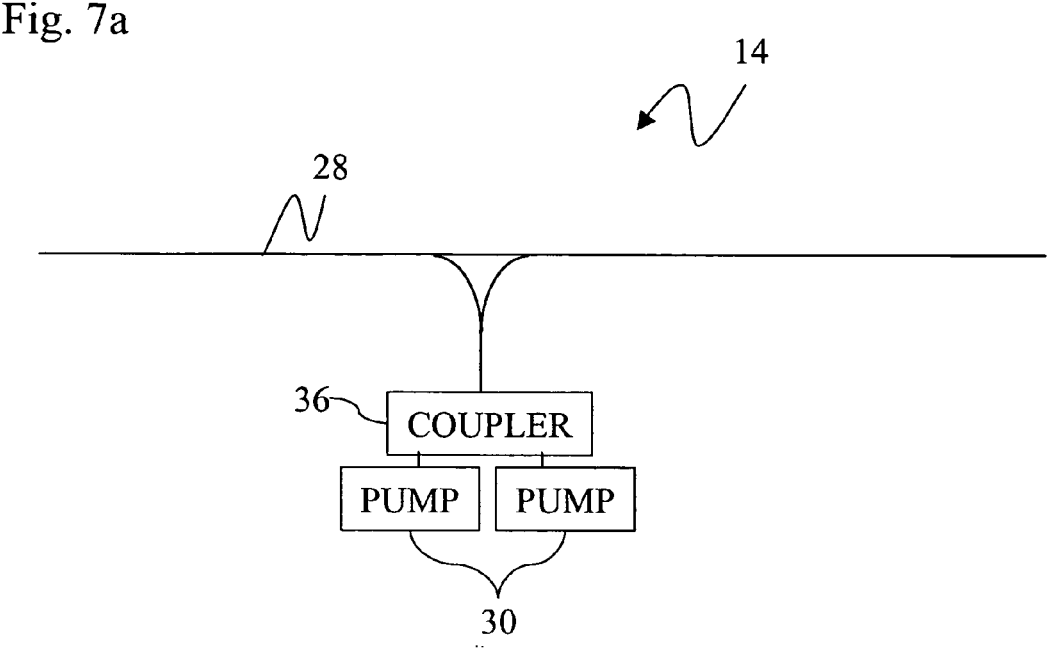
Figure 7B:
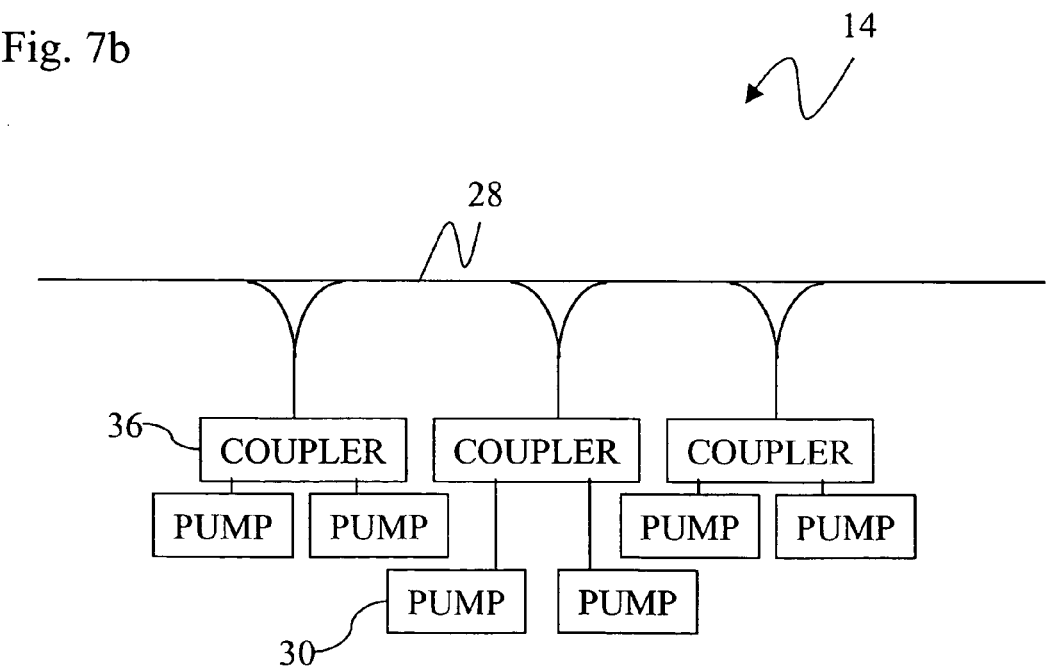

FIGS. 7a and 7b illustrate multiple stage signal varying devices 14 utilizing Raman amplifiers. In FIG. 7a, a common pump source both counter pumps and co-pumps the fiber 28. In FIG. 7b, several pump sources 30 both co-pump and counter pumps at each of several points along the fiber 28.

Many variations are possible with Raman amplifiers, which may be distributed or concentrated, and may utilize the same or different fiber. For example, a first concentrated Raman fiber stage 12 may employ a small core fiber, such as DCF, to provide for efficient Raman amplification of the signal wavelengths. A second concentrated Raman fiber stage 12 may employ a larger core fiber to provide additional signal amplification, while lessening the extent of non-linear interactions compared to smaller core fibers. The second concentrated Raman stage may also employ fiber having low loss in, for example, the 1420–1510 nm range, such as AllWave fiber sold by Lucent Technologies. The use of low loss fiber provides increased pumping efficiency, so that both stages may be more effectively pumped using a common Raman pump 30. Alternatively, the pump source 30 may be configured to provide different Raman pump wavelengths to pump the first and second stages.

In addition, different Raman stages may use fibers that have different chromatic dispersion characteristics. The change in fiber dispersion characteristics will tend to reduce the extent of non-linear interaction that may occur between amplified signal wavelengths. Signal processing, such as adding/dropping, switching, controlling accumulated noise and/or gain profile variations, etc. may be performed between the stages.

In Raman amplifiers, the pump power attenuates with distance traveled in the fiber, resulting in progressively less amplification of the signal wavelengths. However, pump power at higher Stokes order Raman wavelengths (e.g., 1380–1420 nm) may be introduced into the fiber to amplify the lower Stokes order Raman wavelengths (e.g., 1420–1520 nm) which, in turn, will amplify the signal wavelengths (e.g., 1520–1620 nm). In such a system, the first Stokes order pump may be counter-propagating in order to lessen signal degradation due to interference (e.g., crosstalk between the pump power and the optical signal).

For example, pumps 30 may provide Raman wavelengths in the Stokes orders (2i−1) counter-propagating to the signal wavelength range, and Raman wavelengths in the Stokes orders 2i co-propagating with the signal wavelengths, where values of i range from 1 to an arbitrary value. For a signal wavelength in the 1520 to 1620 nm range, the first and second Raman wavelength ranges would be 1420–1520 nm and 1380–1420 nm, respectively, which corresponds to i=1. The pump power may be controlled to compensate for any self-pumping that might occur between the pump wavelengths. If co-propagating Raman wavelengths are staggered by at least every other Raman wavelength and adjacent Stokes orders are counter-propagated, cross-talk between the wavelengths should not greatly affect the signal wavelength.

With proper pump wavelength selection, it is expected that Raman gain may be provided across the optical fiber transparent transmission wavelength range (e.g., approximately 1240 to 1650 nm for silica based fiber). For example, in a transmission signal wavelength range of 1520 nm to 1620 nm, the corresponding pump wavelength range is approximately 1420 nm to 1520 nm. Likewise, in the transmission signal wavelength range of 1250 nm to 1350 nm, the corresponding pump wavelength range is 1150 nm to 1250 nm. Thus, more than one signal wavelength range may be transmitted in the optical system 10. The signal wavelength ranges may be interleaved with the pump wavelengths to provide a multiple signal wavelength range system as stated herein. It is also expected that changes in the optical fiber transmission signal wavelength range may be accommodated by the present invention by proper selection of pump wavelengths.

Although the signal varying devices illustrated in FIGS. 7a and 7b utilize only Raman amplification, they may also utilize other amplification technology, such as Erbium doped amplifiers, and combinations of amplifier types.

Figure 8:
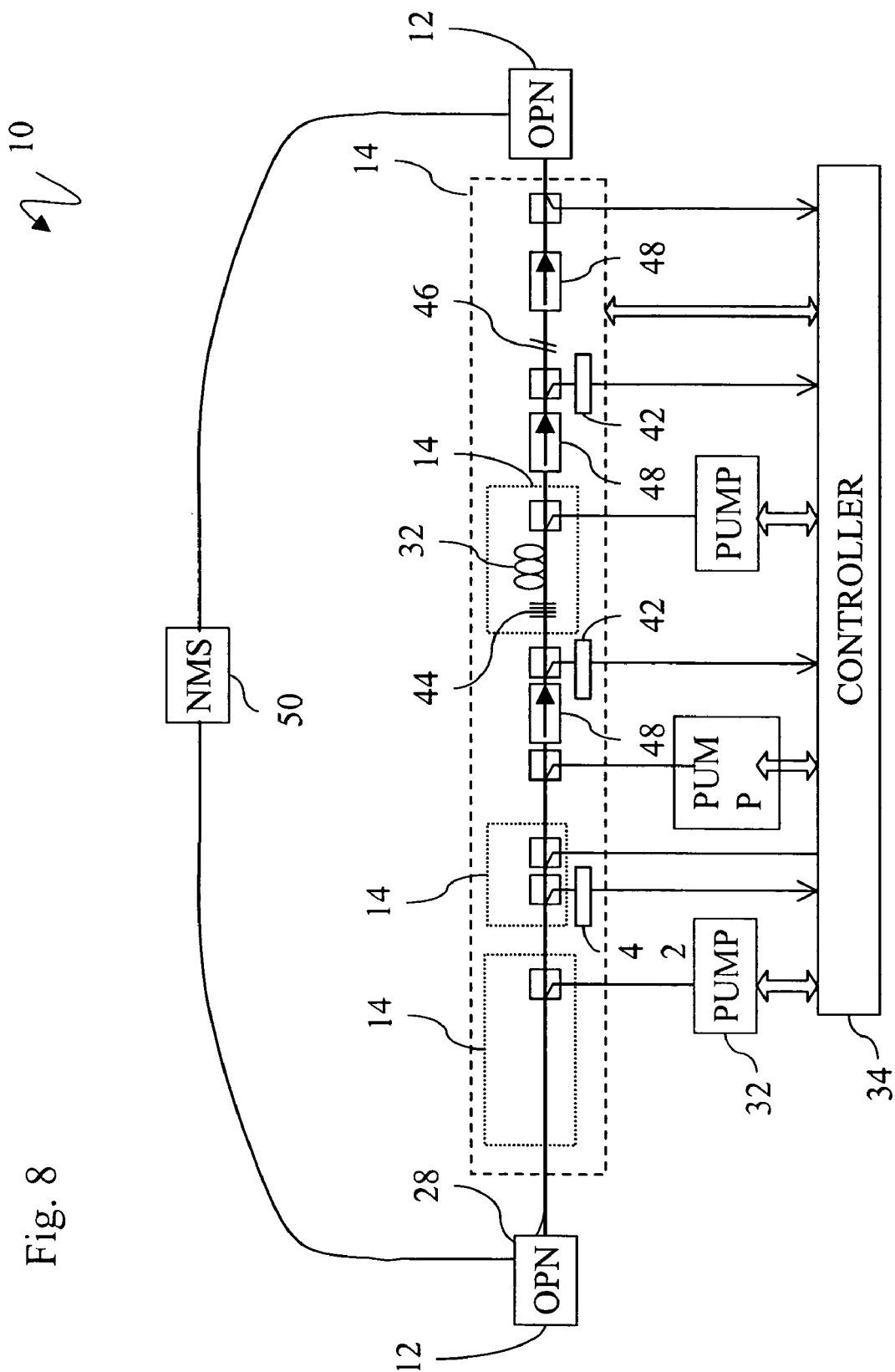
FIG. 8 illustrates another embodiment of a system according to the present invention.

FIG. 8 illustrates another embodiment of the system 10 including monitoring devices 42, such as optical spectrum analyzers, tunable receivers, error rate test devices, etc., which may be used by the controller 34 to monitor signals. The system also includes wavelength selective reflectors 44, such as Bragg gratings, which may be used to reflect excess pump power back into Raman gain fiber or erbium sections 32. Other optical components, such as gain profile varying components, may be included in the devices 14. Gain flattening filters 46 may also be included to impart a fixed or variable gain profile on the optical signal. Optical isolators 48 may be provided to eliminate discrete reflections from the gain flattening filter 46. In that embodiment, the controller 34 transmits and receives supervisory and/or monitoring information (i.e., service information) from a network manager 50. The controller 34, which is connected to several pumps and receives several feedback signals, may be controlling a multi-stage signal varying device 14, or it may be controlling multiple signal varying devices 14.

Figure 9:
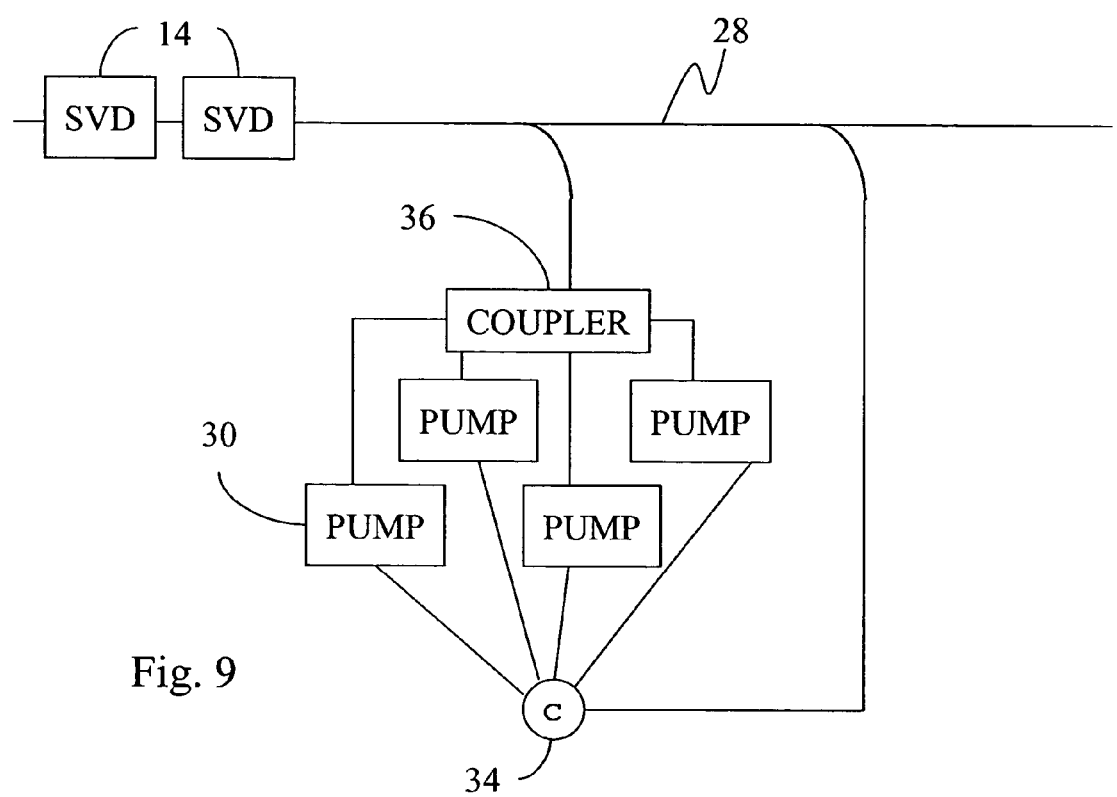
FIGS. 9–10 illustrate remote pumping embodiments of the present invention.
Figure 10:
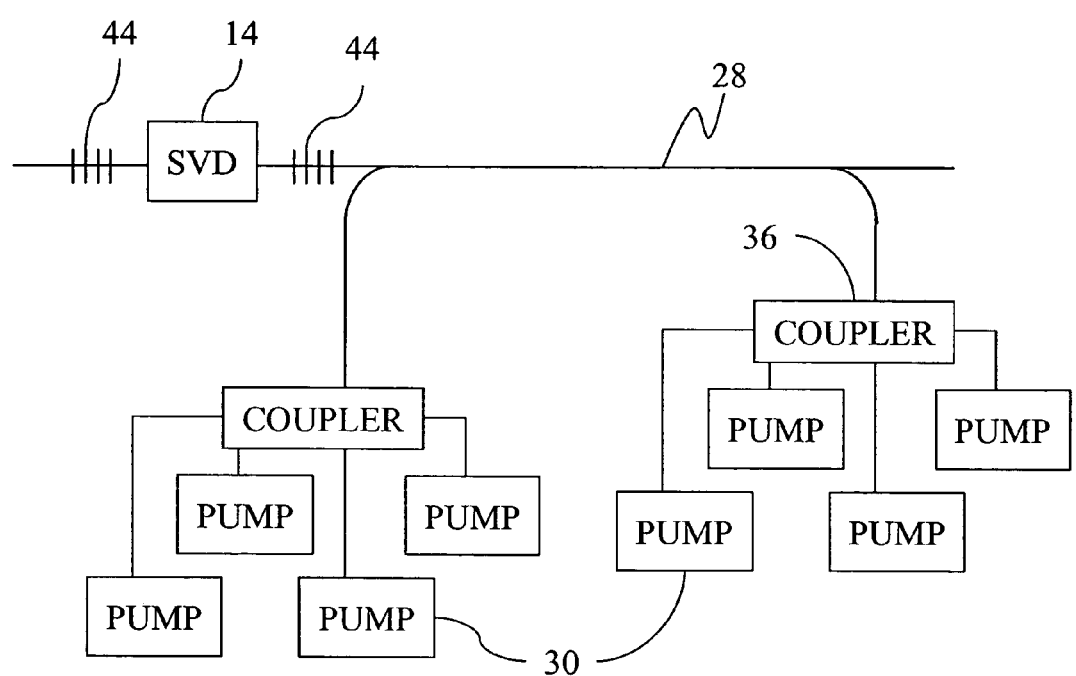

FIGS. 9 and 10 illustrate other embodiments of signal varying device 14 in which the pump sources 30 are remote from the signal varying device 14. The signal varying devices 14 may be configured such that the residual pump power from a distributed Raman amplifier is supplied to pump one or more concentrated or distributed Raman and/or doped fiber at one or more signal varying devices 14. FIG. 9 also illustrates the use of a controller 34 in a remote pumping embodiment.

FIG. 10 illustrates an embodiment including wavelength selective reflectors 44 and providing for additional gain and additional gain profile control. The wavelength selective reflectors 44 may be disposed proximate to the remote signal varying device 14, so that excess pump power is reflected to provide additional gain, such as in a distributed Raman section and/or remote signal varying devices 14, depending upon the position of the reflectors 44.

Additional gain and gain profile control in Raman amplifier stages and remotely pumped doped fiber stages may be produced by including one or more pumps at higher Stokes order Raman wavelengths to amplify lower Stokes order Raman pump wavelengths.

Figure 11A:
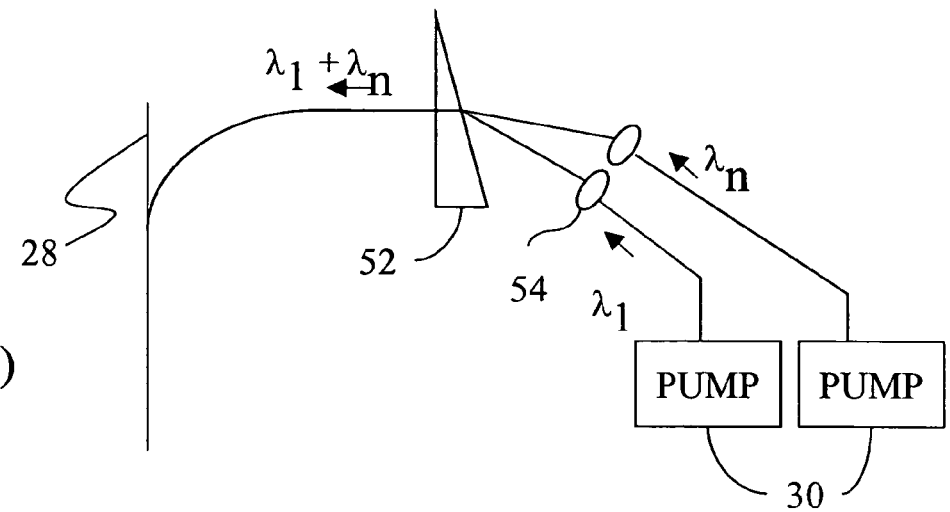
FIG. 11-12 illustrate other embodiments of signal varying devices according to the present invention.
Figure 11B:
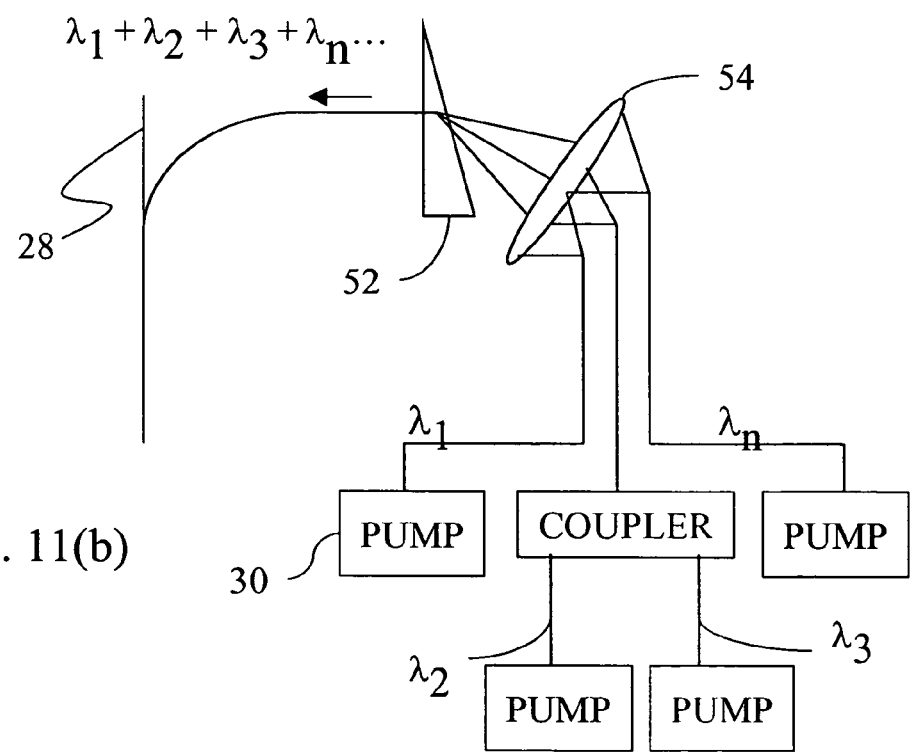
Figure 12:
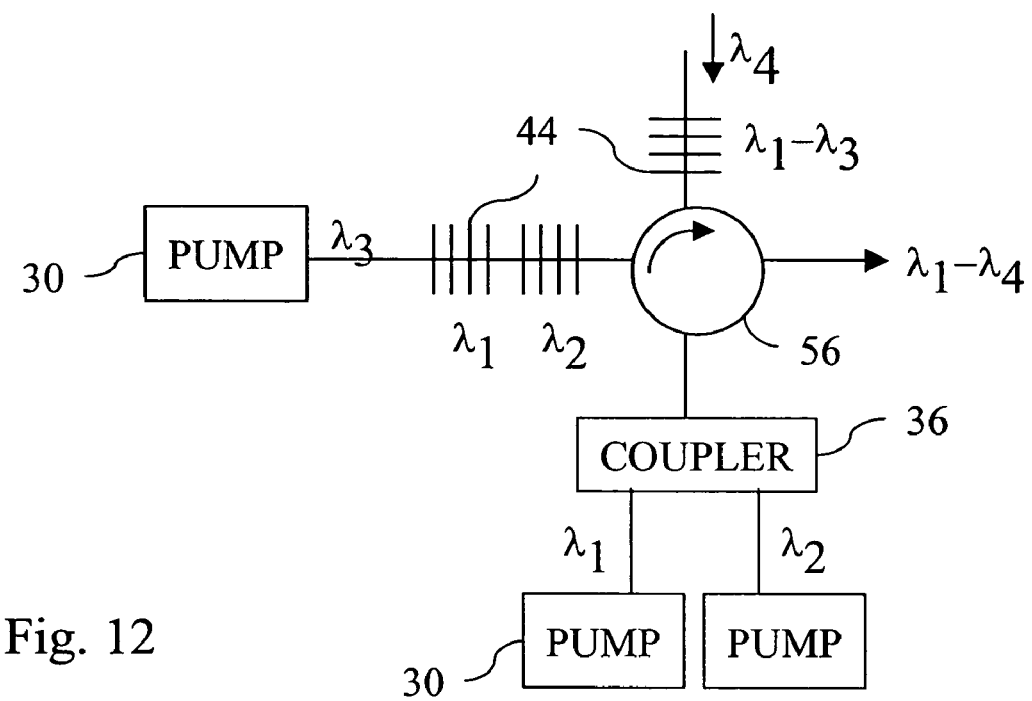

FIGS. 11 and 12 illustrate cascaded combining arrangements which utilize low loss devices. FIGS. 11(*a*&*b*) illustrate the use of prisms 52 and lens 54 to combine a plurality of pump wavelengths. The plurality of pump wavelengths are focused using one or more lenses 54 at appropriate angles into the prism 52, which combines the plurality of pump wavelengths into a single beam that is output into optical fiber in the device 14 or the transmission fiber 28. The difference in the angles of incidence is determined based on the refractive indices of the prism for each wavelength.

The difference in the refractive indices for each wavelength may be used to calculate the angle of incidence on the prism for each wavelength. The index of refraction in the prism is calculated as:

$$n(\lambda)=(A+B\lambda^2/(\lambda^2-C)+D\lambda^2/(\lambda^2-E))^{1/2} \text{ and}$$

$$\theta(\lambda) \text{ (radians)}=a\ \sin(n(\lambda)*\sin(\alpha)),$$

where $\alpha=22\pi/180$, $\theta$ is the refraction angle, $\lambda$ is the pump wavelength, and A–E are prism constants. For example, a AgGaSe$_2$ prism (A–E=3.9362, 2.9113, 0.1507, 1.7954, 1600) may be used to combine two pump wavelengths at 1480 and 1470, respectively. The pump wavelengths are transmitted into the prism at angles which differ by approximately 0.136 degrees to produce a combined signal exiting the prism 52. Combining prisms 52 may also be cascaded in a manner similar to couplers and other multiplexing devices to combine additional pump sources.

FIG. 12 illustrates one embodiment that uses a circulator 56 and gratings 44 to combine pump wavelengths. Such an arrangement typically provides for less loss, but is typically more expensive, than a comparable coupler arrangements. The circulator 56 may be provided with a plurality of ports and corresponding gratings to combine the pump wavelengths. One or more circulators 56 may also be cascaded.

Figure 13:
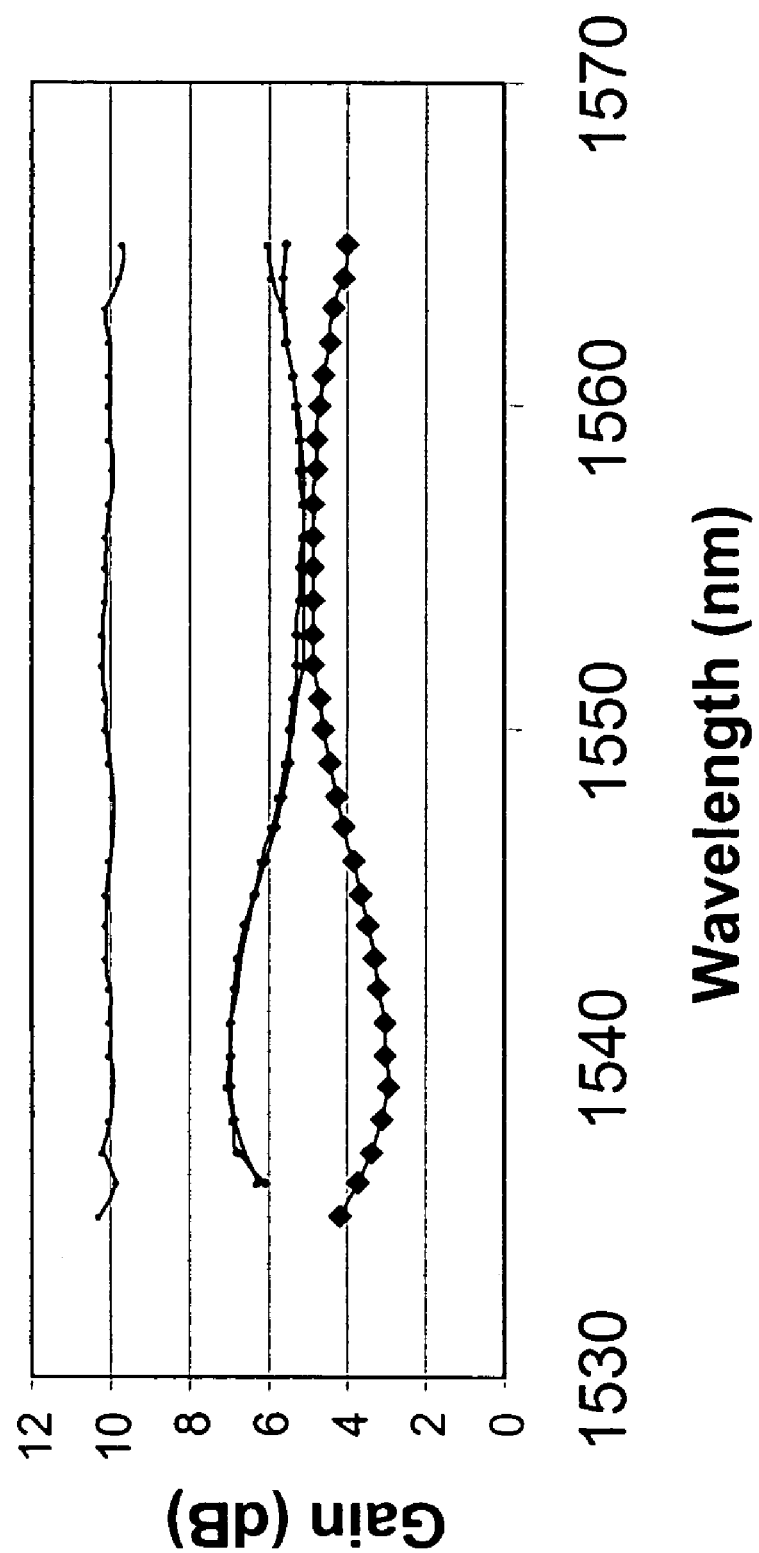
FIGS. 13–16 illustrate gain profiles according to various embodiments of the present invention.

FIG. 13 illustrates several plots of gain versus wavelength that may be produced, for example, by using a distributed Raman amplifier and providing pump power to a remotely located erbium doped fiber 32. The bottom plot shows the remote erbium gain profile and the middle two plots show target and achieved Raman gain profiles. The top plot shows the overall gain profile, which is the overall signal variation profile. The overall gain profile may represent a multi-stage signal varying device 14, or it may represent a combined gain profile from several signal varying devices 14. The pump wavelengths and pump powers were selected to provide complementary non-linear gain profiles so that the resulting overall profile is substantially uniform. Other signal variation profiles may also be produced. For example, the gain profile may be tilted to offset higher bending losses at longer wavelengths or to compensate for other loss variations.

The signal variation profile may be varied by varying the number of pump wavelengths, the choice of wavelengths, the wavelength powers, and the wavelength spacing. Other variations, such as varying the pump power for one or more pump wavelengths, with or without changing the total pump power, may also be used to change the signal variation profile over part of all of the wavelength range. The pump wavelengths are often selected to provide sufficient overlap of the gain profiles to control the gain at one or more wavelengths in the transmission wavelength range. Decreasing the spacing intervals of the pump wavelengths can increase the uniformity of the intensity profile, but it also increases cost and power consumption.

Figure 14A:
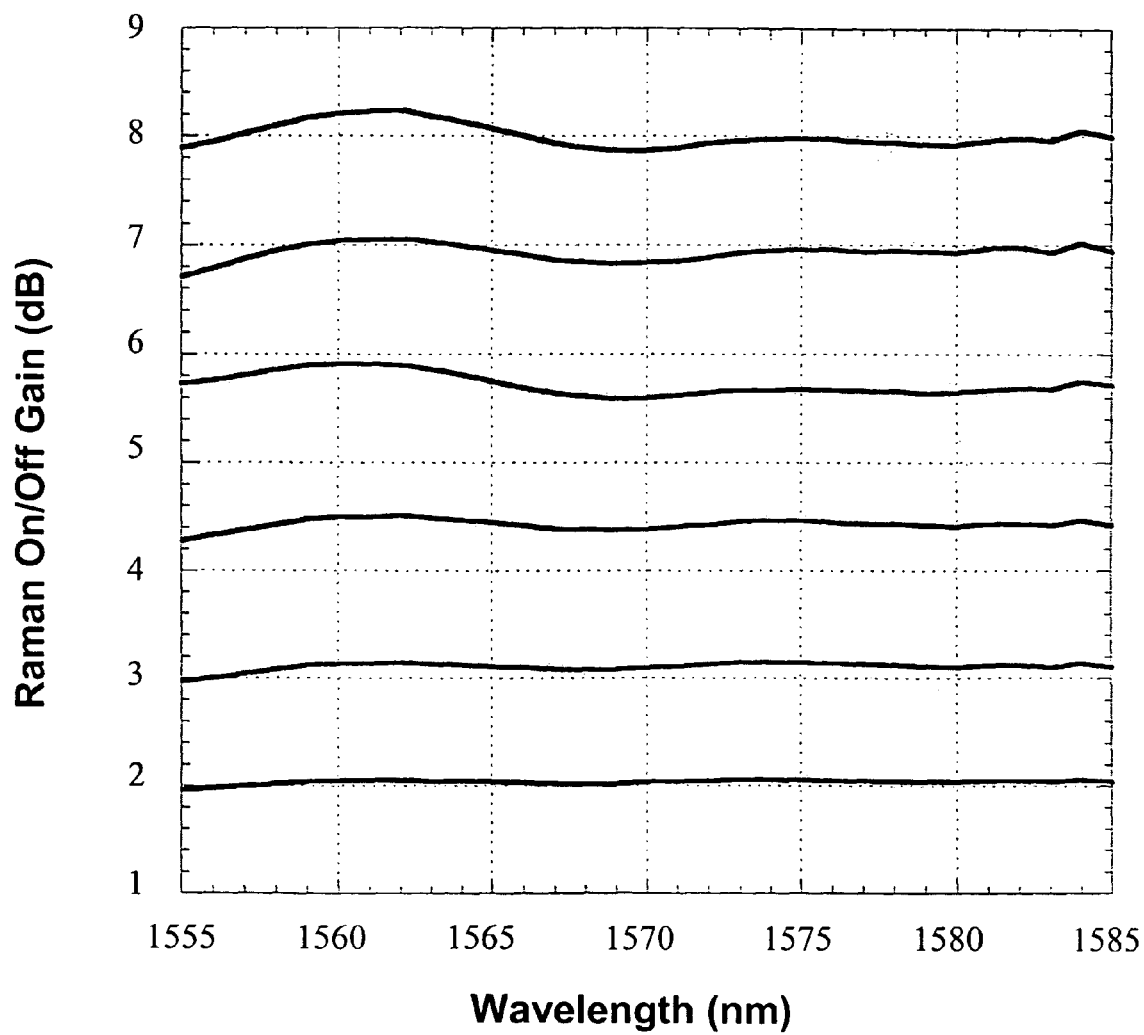
Figure 14B:
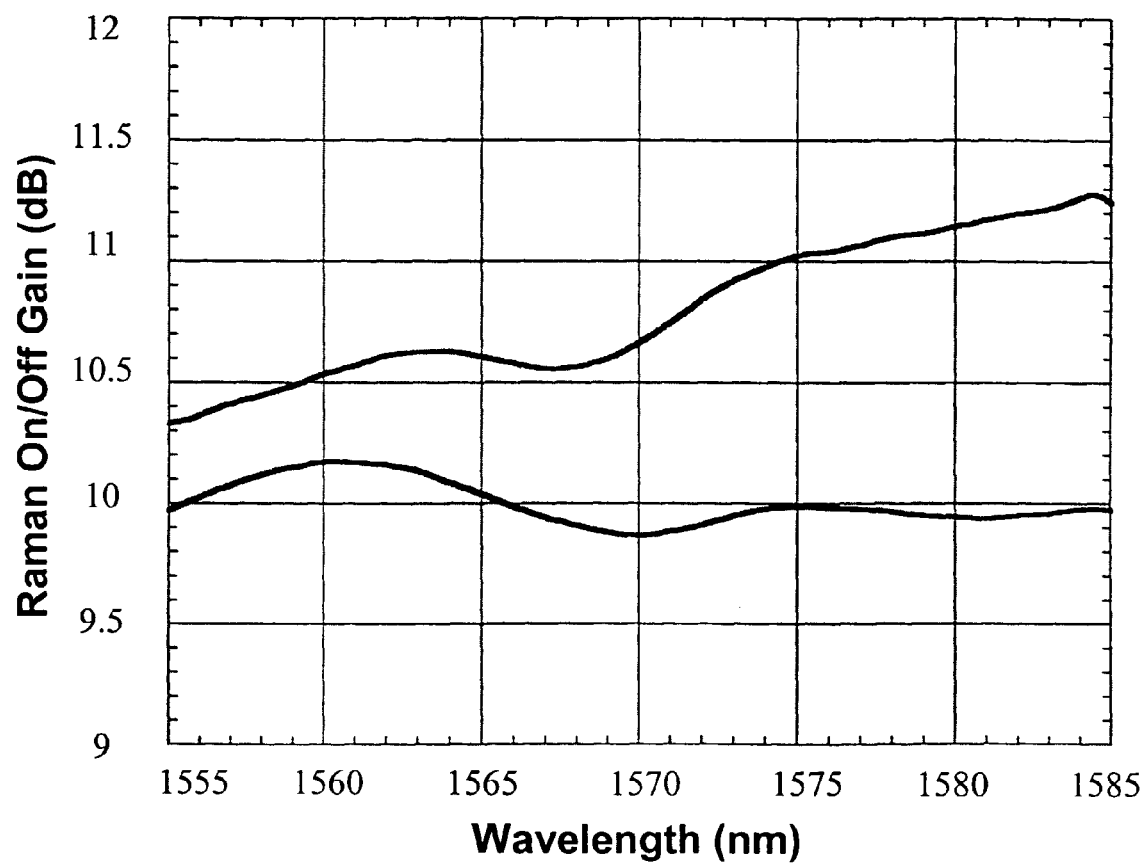
Figure 15:
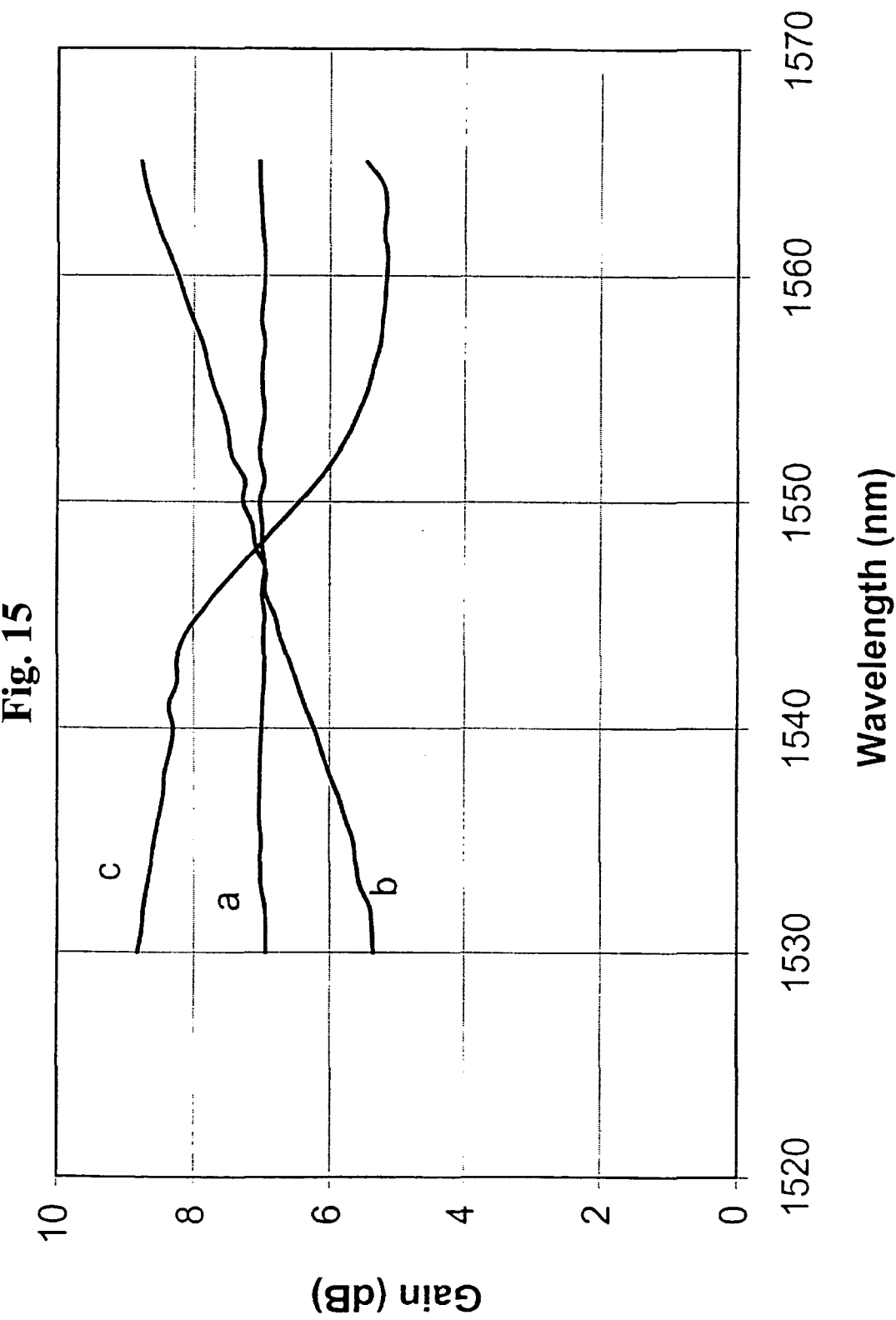
Figure 16:
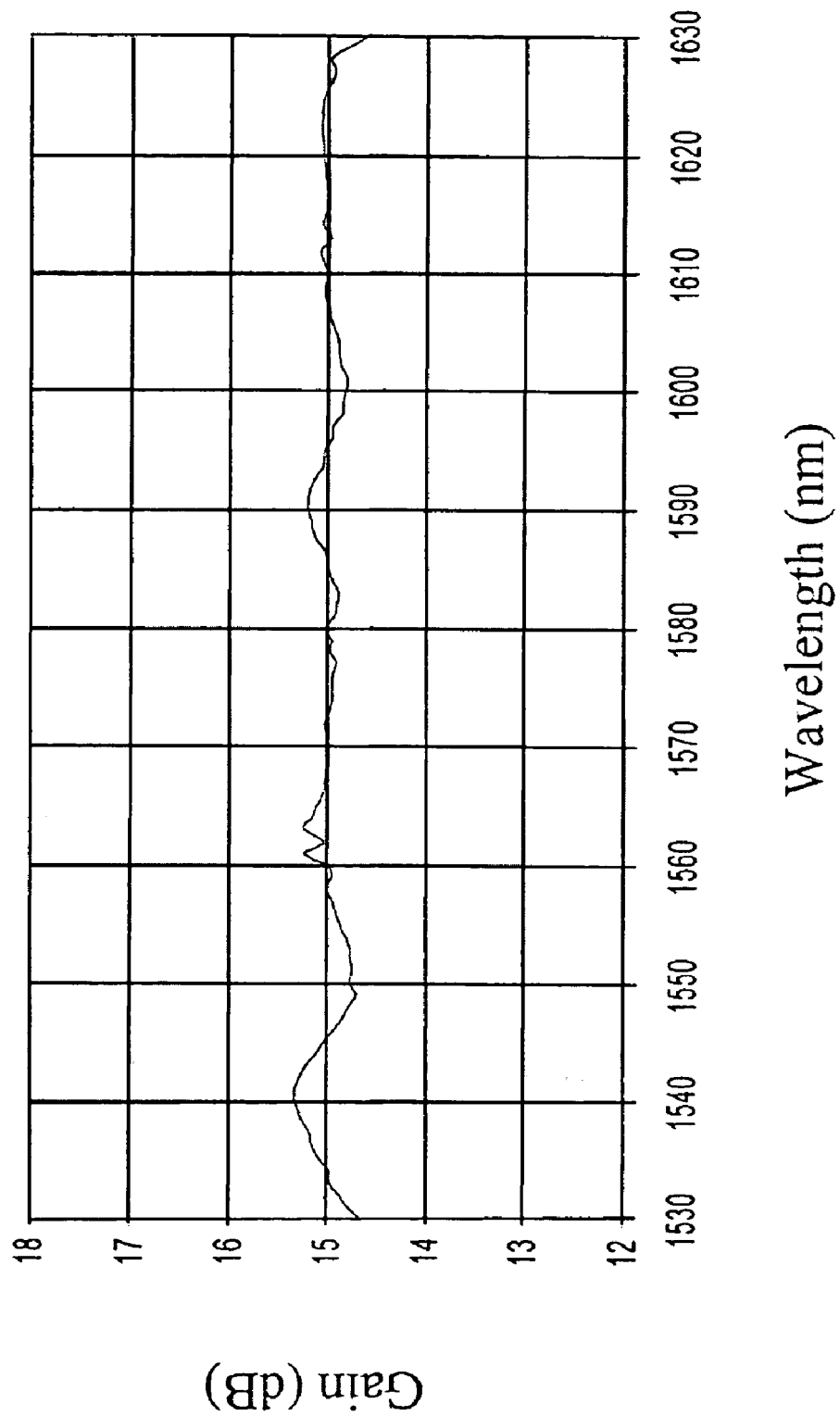

FIGS. 14–16 show exemplary Raman gain profiles that can be produced using various embodiments of the present invention. In FIG. 14, the signal varying device 14 shown in FIG. 4 utilized four pump wavelengths (1450, 1460, 1485, and 1495 nm), which were combined using two 20 nm DWDM couplers and a dichroic filter. The combined pump wavelengths were supplied to DCF to provide Raman gain in the transmission signal wavelength range of 1555 to 1585 nm. FIG. 14*a* shows substantially flat Raman gain signal variation profiles (±0.16 dB) can be produced over a 30 nm range for gains ranging from 1 to 8 dB. FIG. 14*b* shows the relative power of the pump wavelengths supplied to the device 14 can be varied to produce non-linear profiles that generally increase or decrease across the signal wavelength range.

In FIGS. 15 and 16, experimental gain profiles were determined for a number of additional pump wavelengths. Based on the experimental results, Raman signal varying device simulations were performed over 35 nm wide (1530–1565 nm) and 100 nm wide (1530–1630 nm) signal wavelength ranges for FIGS. 15 and 16. The predicted performance of ±0.12 dB and ±0.342 dB over the 35 nm and 100 nm wavelength ranges, as shown in FIGS. 15 (curve a) and 16, respectively, indicates that the signal varying devices of the present invention can be used over a wide range of wavelengths to accommodate numerous channels. FIG. 15 (curves b and c) also shows examples of linear and non-linear profiles that can be produced by varying the relative power at the various pump wavelengths. It is also expected that the number of pumps and the pump wavelength spacing can be further varied to provide a range of signal variation profiles over wide and narrow wavelength ranges.

Figure 17:
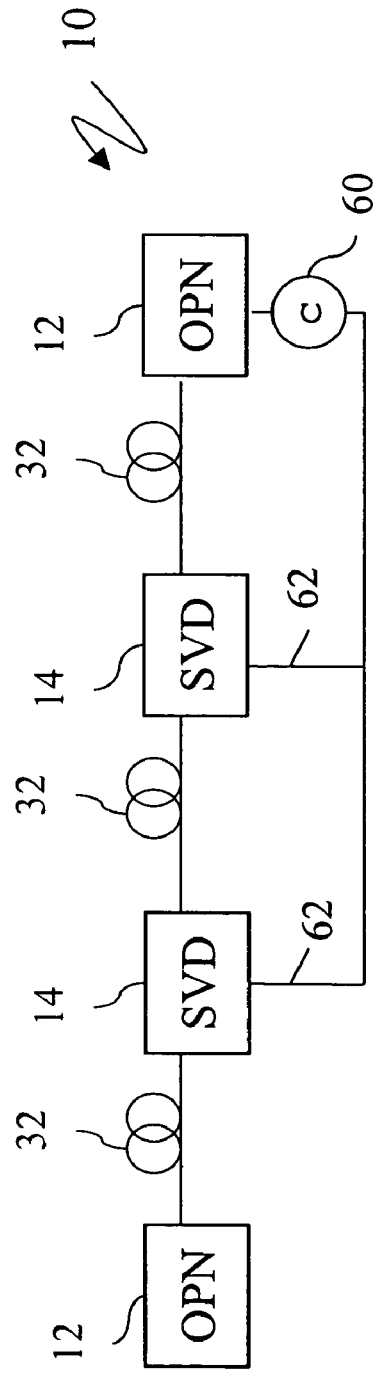
FIGS. 17 and 18 illustrate embodiments of systems according to the present invention
Figure 18:
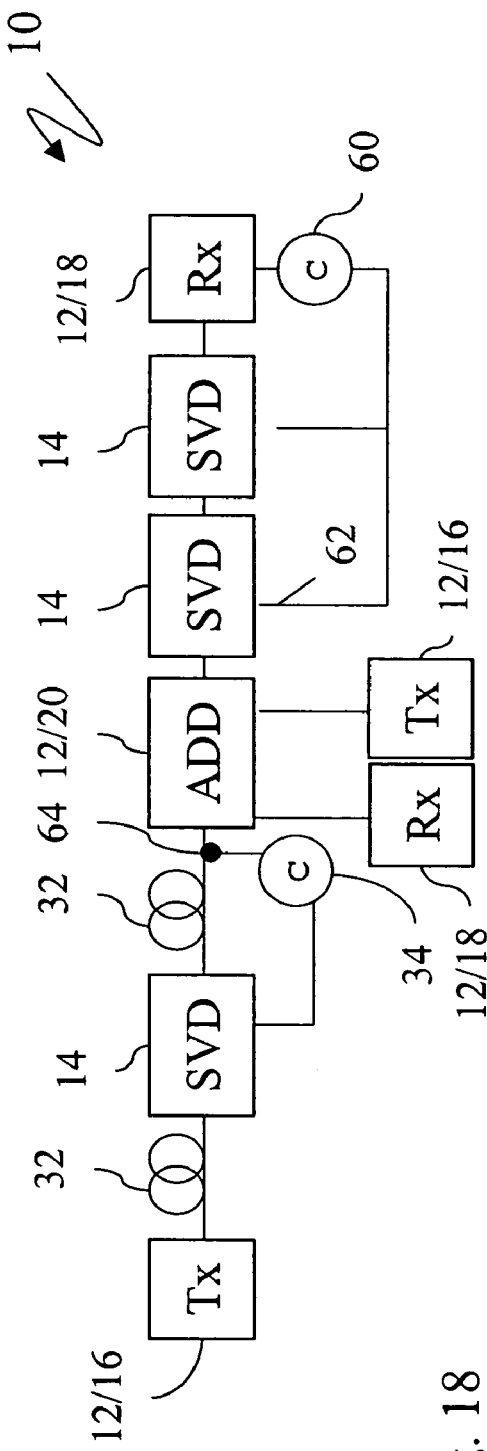

FIGS. 17 and 18 illustrate embodiments of the system 10 which include controllers that are remote from the signal varying devices 14 and pumps 30 (hereinafter referred to as "remote controllers 60"). The remote controllers 60 may be the same as the controllers 34 described hereinabove, except that they are remote from the signal varying devices 14 and pumps 30 they control. For example, the remote controllers 60 may detect and monitor one or more characteristics of optical signals, and the detected characteristics can be used by the remote controllers 60 to provide remote feedback control to the signal varying devices 14 via control lines 62.

As illustrated in FIG. 18, the remote controllers 60 may monitor the optical signals at a point 64 in a link and control one or more of the signal varying devices 14 at other points in that link, or signal varying devices 14 in a different link. In another example, the remote controller 60 can control one or more signal varying devices 14 along a link to produce desired characteristics in optical signals reaching a processing node 12. The remote controllers 60 may be connected to the fiber 28 or via another device, such as a receiver 18 in an optical processing node 12. FIG. 18 also illustrates a system 10 utilizing both a remote controller 60 and a controller local to the signal varying device 14 or pump 30 it controls (hereinafter referred to as a "local controller 34").

The remote controllers 60 can provide coordinated control over one or more signal varying devices 14 to achieve a result over a large section of the system 10. Also, the coordinated use of remote controllers 60 and controllers proximate the signal varying device 14 (hereinafter referred to as "local controllers 34") can provide a complementary control scheme for the system 10.

The remote controllers 60 can be configured to control the signal characteristics over an optical link, which generally includes the optical transmission fiber 28 and at least one signal varying device 14, extending between the processing nodes 12. A remote controller 60 may also be used to control signal characteristics over multiple links, either separately or collectively, or over only a portion of a link.

The control lines 62 can include dedicated lines and/or as supervisory channels transmitted on the fiber 28 between the remote controller 60 and the signal varying devices 14. The supervisory channels can, for example, be transmitted as one or more separate optical channels on the fiber 28 connected to the device 14 being controlled, or on one or more separate fibers, with or without other signal channels traveling towards the device 14.

The remote controllers 60 may be used to control the signal varying devices 14 collectively, in groups, or individually as required in the system 10. For example, the remote controllers 60 may directly control the signal varying devices 14, such as by directly controlling the pump sources 30, or the remote controllers 60 may indirectly control the signal varying devices 14, such as by sending control signals to one or more local controllers 34. For example, the remote controllers 60 can send signals giving the local controllers 34 instructions, such as to increase or decrease the gain by a certain amount, change to another gain profile, modify another parameter of the signal varying device, etc. The remote controller 60 can give specific instructions on how to achieve the desired result, such as to increase pump power by 2 dB, or it can be left to the local controllers 34 to determine how to best-achieve the desired control instructions. Alternatively, the remote controllers 60 can provide only feedback of remote signal characteristics, and the local controllers 34 can make the control decisions. Furthermore, as discussed above, the local controllers 34 can monitor and adjust their own signal varying device 14 and the signals passing through the signal varying device 14 to achieve other desired results. The complexity of the remote controllers 60 overseeing the operation of the system 10 will depend, in part, upon the extent of individual control exerted over the individual signal varying devices 14. For example, the control scheme can be simplified by operating the signal varying devices 14 in concert to achieve desired characteristics in the signal arriving at a processing node 12.

The remote controllers 60 can provide remote control signals to some or all of the signal varying devices 14. For example, the remote controllers 60 can provide remote control signals to signal varying devices 14 in key locations, or the remote controllers 60 can provide control signals to every third signal varying device 14, or in some other distribution. One remote controller 60 can provide feedback to one or more signal varying device 14. If multiple remote controllers 60 are used, each remote controller 60 can control its own unique subset of signal varying devices 14, or there can be overlap in the signal varying devices 14, such as to provide redundancy in the event of a failure of a remote controller 60, or to provide cooperative control, such as through voting mechanism in which the signal varying devices 14 can disregard remote control signals which are inconsistent with a majority of other remote control signals or which are out of a preset range, or through averaging the remote control signals, or through other mechanisms. Signal varying devices 14 that do not receive control signals from the remote controllers 60 can include a local controller 34 to provide control as discussed above, or they can have neither a local controller 34 nor feedback from a remote controller 60.

Figure 19:
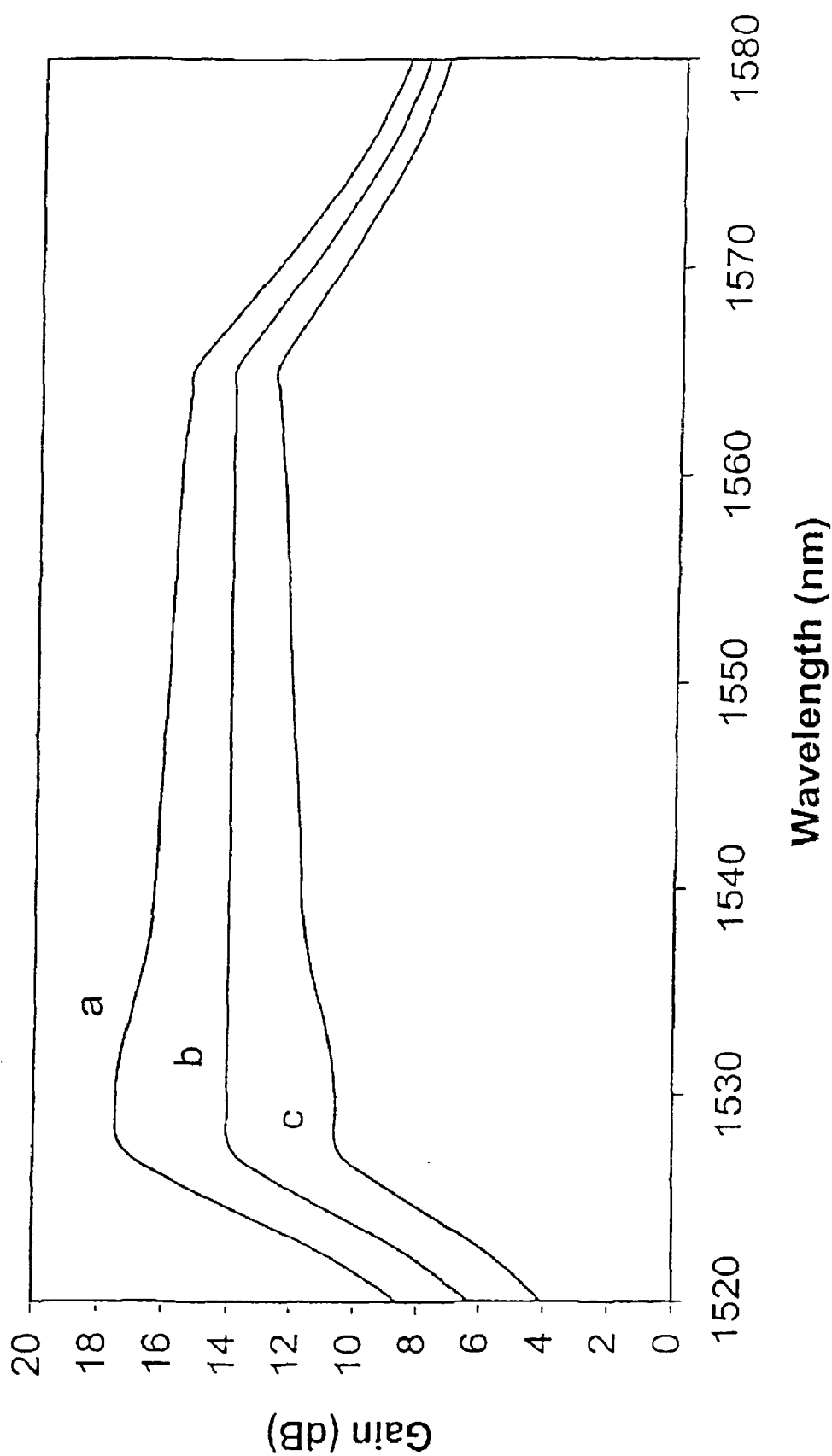
FIG. 19 illustrates gain profiles according to the present invention.
Figure 20A:
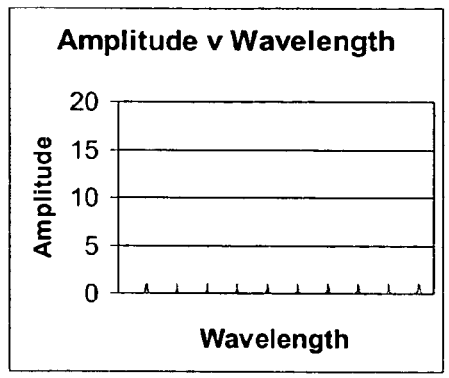
FIGS. 20a–20f illustrate an example of signals passing through a system according to the present invention.
Figure 20B:
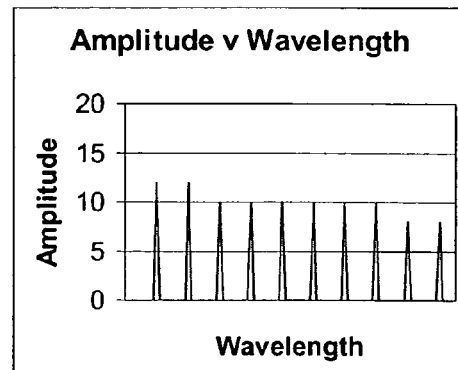
Figure 20C:
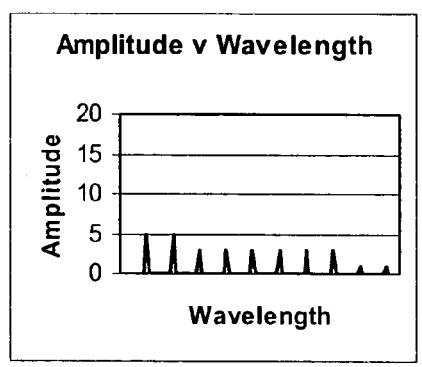

FIGS. 19 and 20a–20f illustrate the interaction of the remote controller 60 with the signal varying devices 14. FIG. 19 shows several exemplary EDFA gain curves, illustrating how EDFA performance can vary with signal wavelength and amplification power (gain) of the EDFA. FIG. 20a depicts an optical signal intensity profile versus wavelength for a signal prior to entering a signal varying device 14. A flat intensity profile is shown in FIG. 20a to facilitate explanation of the remote controller 60. If a signal varying device 14 is operated as an amplifier according to gain curve (a) shown in FIG. 19, then the signal of FIG. 20a will emerge from the signal varying device 14 having an intensity profile similar to that shown in FIG. 20b. As the optical signal proceeds though the fiber 28, it incurs fiber losses and may develop an intensity profile similar to FIG. 20c as it enters a subsequent signal varying device 14. If a subsequent signal varying device 14 is operated as an amplifier having a gain profile similar to curve (b) in FIG. 19, then the optical signal will emerge from the subsequent signal varying device 14 having an intensity profile similar to FIG. 20d.

Figure 20D:
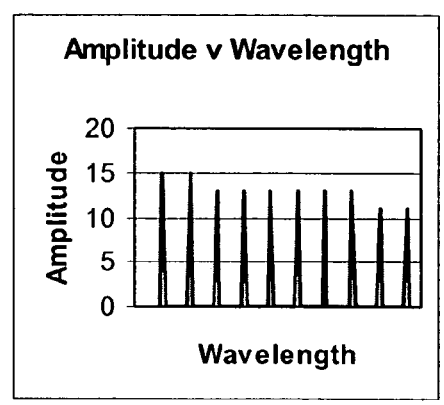
Figure 20E:
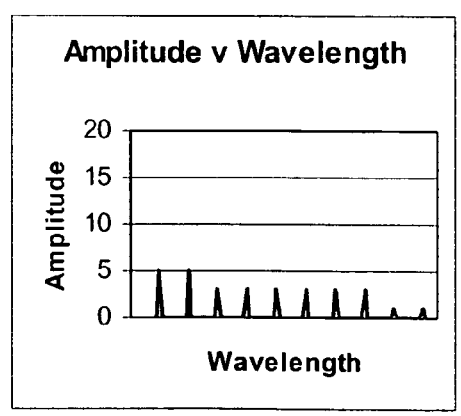
Figure 20F:
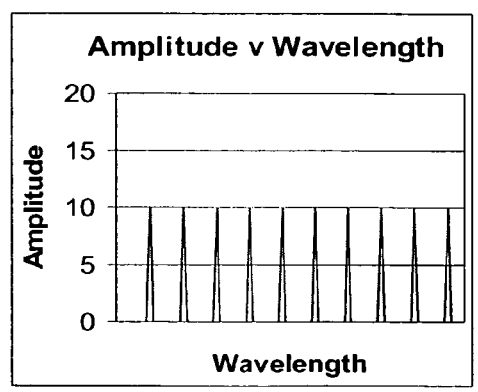

The optical signal of FIG. 20d can be further propagated through the fiber 28 and additional signal varying devices 14 incurring further fiber losses and gain profile variations. As the optical signal enters a signal varying device 14 preceding an optical processing node, it may have a profile similar to FIG. 20e. If the signal varying device 14 preceding the optical processing node is operated having a gain profile similar to curve (c) in FIG. 19, then the optical signal will emerge from the preceding signal varying device and reach the processing node having a substantially uniform gain profile similar to that shown in FIG. 20f.

The control of each signal varying device 14 can be based on the profile of the optical signal at the optical processing node 12 (FIG. 20f), or it can be based on a profile at another point, such as the profile at each signal varying devices 14 along the link. While the example shown in FIGS. 20a–f uses the signal intensity and profile as the detected characteristics, other characteristics, such as noise and signal to noise ratio, and statistical measures, such as maximum, minimum, averages, and distributions, can also be used to control the system 10.

In one embodiment, the remote controller 60 is used to detect and monitor the optical signal as it approaches the optical processing node 12. In another embodiment, the remote controller 60 is used to variably control the performance of the signal varying devices 14 in the link to achieve the desired characteristic at the processing node 12. The control function can be performed by tapping off a portion of the optical signal as it approaches or reaches a processing node and detecting the optical signal characteristics, such as with an optical spectrum analyzer.

The detected signal characteristics can be compared to either absolute or relative reference characteristics, such as the desired wavelength characteristic profiles. The comparison yields a system variance that is compared to a control variance. If the system variance is within the control variance, the remote controller 60 does not vary the settings of the signal varying devices 14 in the link. If the system variance is outside the control variance, the remote controller 60 will send control signals via control line 62 to vary the settings of the signal varying devices 14 until the system variance is within the control variance.

For example, in an embodiment in which the signal varying device 14 includes Raman and erbium amplifiers, the optical or pump power, i.e., pump power, supplied to the amplifiers can be controlled to vary the output power of the amplifier to achieve the desired characteristics at the optical processing node. In addition, the Raman or erbium fiber sections can also serve as variable attenuators in which the loss of the sections is controlled by varying the pump power supplied to the Raman or erbium fiber sections.

The remote controller 60 can be used to control the optical signal characteristics by varying the performance of one or more of the signal varying devices 14 individually, in groups, or collectively. The control system complexity, stability, and range of applicability will invariably depend upon the manner in which the signal varying devices 14 are operated.

For example, consider an embodiment in which only one out of N signal varying devices 14 in a link is being controlled by the remote controller 60. The remote controller 60 will most likely have to vary the one signal varying device 14 over a wide range to compensate for uncontrolled variations in the N-1 independent signal varying devices 14. In contrast, if all the signal varying devices 14 in the link are individually controlled, the remote controller 60 can vary the performance of any combination of signal varying devices 14 to produce a change in the optical signal characteristics. However, the number of possible control combinations may require more complex control schemes and could lead to system instability and slower response times. In contrast, when all of the signal varying devices 14 in the link are controlled in concert by the remote controller 60, the link can be controlled with a less complex control scheme. This is because the possible control combinations have been decreased and variations in the system can be averaged over all of the signal varying devices 14 in the link. Also, the link stability is improved because the signal varying device 14 performance is varied continuously along the link. As such, the probability that any given signal varying device 14 will have to be adjusted grossly will be reduced, thereby improving the response time of the link.

Individual control over the signal varying devices 14 can be useful for facilitating initialization during manufacturing and installation, and resetting and fine tuning of the signal varying devices 14 during operation. The signal varying devices 14 can also be controlled in groups, to provide additional control over different types of signal varying devices 14 deployed in the system 10.

FIGS. 21–29 show various embodiments of signal varying devices 14 including one or more of an amplifier 66, an attenuator 68, and a filter 70, although the signal varying devices 14 can include other components and other combinations of components, such as various gain flattening configurations. In addition, most embodiments illustrate the remote control line 62 as being directly connected to just one of the components, although the control line 62 may be connected to more than one component to allow for control over more than one characteristic of the signal varying device 14, and it can be connected to the local controller 34, either alone or in combination with one or more of the components, or via one or more intermediate devices or processors. Likewise, the local controller 34 can be connected at points 64 in the signal varying device 14 other than those shown in the illustrated embodiments, and it can be connected via one or more local control lines 72 to components and to combinations of components other than those shown in the figures. Furthermore, the combination and type of components and controllers 34, 60 may be used in variations and combinations other than those illustrated in the Figures to realize advantages of the present intention. While the present invention does not require that each signal varying device 14 operate with a uniform gain profile, improved gain profile flatness will tend to increase the stability, flexibility, and overall performance of the system 10.

The amplifiers 66 and attenuators 68 can be single or multiple stages, and can include EDFAs, Raman amplifiers, and/or other gain flattening amplifier configurations. The amplifiers 66 and attenuators 68 can include concentrated and/or distributed amplifiers, other combinations that provide fixed or variable gain and/or attenuation, and can also include other components, such as gain flattening filters. The amplifiers 66 and attenuators 68 can be controlled, for example, by varying the pump power, which can be provided locally or remotely. Such control can be affected by the local controllers 34 and remote controllers 60 and can allow a single device to operate as both an amplifier and an attenuator, as necessary to achieve the desired signal characteristics.

The filters 70 can include, for example, one or more Mach-Zehnder, Fabry-Perot, Bragg grating, dichroic filters, etc., which may be fixed or tunable, or other filters as may be required in system 10. The filters 70 may be used in combination with other components, such as directional couplers and/or circulators to vary the signal, such as described in U.S. Pat. Nos. 5,007,705, 5,283,686 and 5,579,143.

In FIG. 21, the signal varying device 14 is controlled jointly by the local 34 and remote controllers 60, with the remote controller 60 controlling the variable attenuator 68 and the local controller 34 controlling the amplifier pumps 30. The remote controller 60 uses the attenuator 68 to vary the optical signal intensity after the optical signal has passed through the amplifier 66 and filter 70. The optical signal emerging from the variable attenuator 68 has a signal intensity profile versus wavelength that was produced by the preceding amplifier 66 and filter 70, and reduced via the attenuator 68 to a level controlled by the remote controller 60. The controller 34, 60 receives feedback from a point 64 after the optical signal has passed through the amplifier 66, filter 70, and attenuator 68. The local controller 34 may, for example, vary the power supplied by the amplifier pumps 30 to control the output power of the signal varying device 14. The local controller 34 may also adjust the pumps 30 so that the power levels of the optical signals leaving the signal varying device 14 are maintained at a predetermined power level. That predetermined power level can be, for example, the power necessary to overcome the loss in the fiber 28 and to provide a signal having a predetermined power at the next signal varying device 14 or processing node 12.

In FIG. 22, an additional amplifier 66 is provided after the attenuator 68 and is controlled by the local controller 34 to provide additional flexibility in controlling the optical signal characteristics.

In FIG. 23, the signal varying device 14 includes the attenuator 68 preceding the amplifier 66 with the filter 70 at the end. In this configuration the amplifier 66 can be preset to deliver a prescribed level of amplification to the signal. The attenuator 68 can be operated to control the input power to the amplifier 66 so that the signal will exit the amplifier 66 and pass through the filter into the fiber at a predetermined intensity.

In FIG. 24, the amplifier 66 can be operated at a predetermined amplification power. The attenuator 68 is then operated to deliver the optical signal into the fiber 28 at a predetermined intensity.

Figure 25:
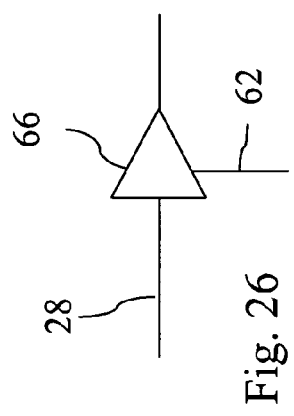
Figure 26:
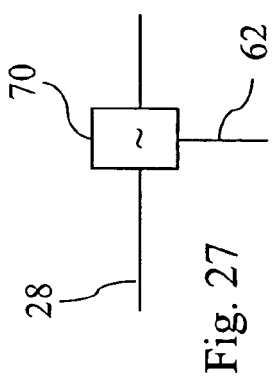
Figure 27:
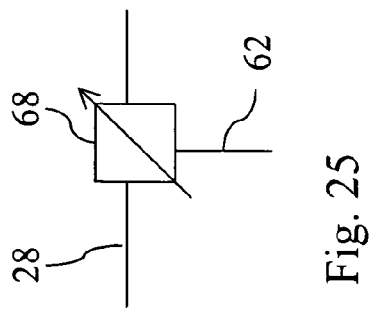

FIGS. 25–27 show the signal varying device 14 can be embodied solely as attenuators, amplifiers, and filters, respectively. In the illustrated embodiments, each of the devices is controlled by the remote controller 60, although the local controller 34 can be used in place of or in conjunction with the remote controller 60.

Figure 28:
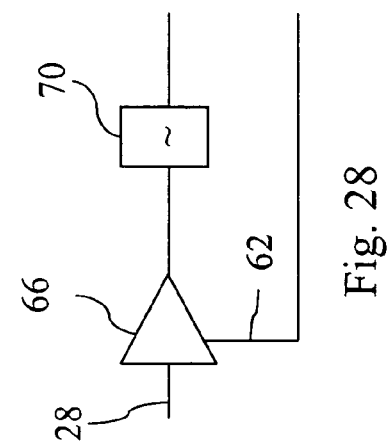

In FIG. 28, an amplifier 66 is operated in combination with the filter 70 to vary the characteristics of the optical signal being delivered into the fiber 28.

Figure 29:
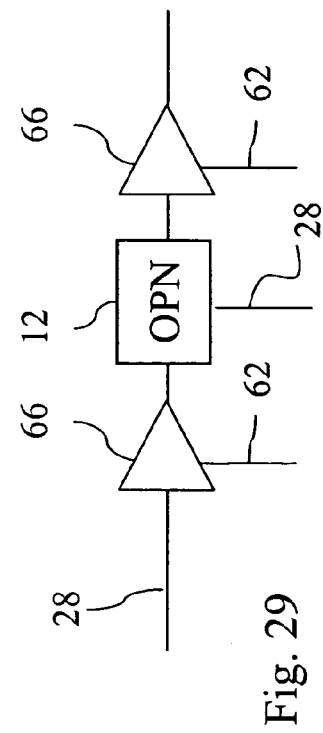

In FIG. 29, the signal varying device 14 is associated with a processing node 12. This configuration can provide for monitoring and control of the signal characteristics immediately before and after the signal has been processed in the processing node 12. In an alternative embodiment, the signal varying device 14 can be within the processing node 12.

Unlike prior art systems, the present invention can provide for increased stability as the length of the system 10 is increased. The increased stability is possible because the system performance can be averaged over a larger number of signal varying devices between optical processing nodes. Thus, the addition of signal varying devices 14 to the system 10, while adding loss to the system 10, can actually provide additional system stability.

Those of ordinary skill in the art will appreciate that numerous modifications and variations that may be made to specific aspects of the present invention without departing from the scope of the present invention. It is intended that the foregoing specification and the following claims cover such modifications and variations.

The invention claimed is:

1. An optical system comprising:
a plurality of optical nodes configured to communicate via optical signals in at least one signal wavelength range passing through an optical fiber; and,
a plurality of optical amplifiers positioned to amplify the optical signal passing between the optical nodes, wherein at least one of the plurality of optical amplifiers includes:
a first pump source configured to provide optical energy in a first set of pump wavelengths to produce Raman gain having a first signal variation profile in the optical signals over the signal wavelength range, and
an erbium doped fiber amplifier including an erbium doped optical fiber and an optical pump source configured to provide optical energy in a plurality of pump wavelengths to the erbium doped optical fiber to produce erbium gain having a second signal variation profile in the optical signals over the signal wavelength range; and,
a controller positioned proximate at least one of the optical nodes and configured to control the plurality of optical amplifiers to achieve a desired signal characteristic in the optical signals, when the optical signals reach the at least one of the optical nodes proximate the controller.

2. The optical system of claim 1, wherein:
the first pump source is configured to provide distributed Raman amplification in at least a portion of the optical fiber; and,
the at least one of the plurality of optical amplifiers includes a concentrated Raman amplifier configured produce Raman gain in the optical signals passing through the concentrated Raman amplifier over the signal wavelength range.

3. The optical system of claim 2, wherein the first pump source is configured to counter-propagate optical energy relative to the optical signals to provide distributed Raman amplification of the optical signals passing through the optical fiber.

4. The optical system of claim 2, wherein the concentrated Raman amplifier is configured as a signal varying device to provide at least one of amplification, attenuation, and lossless transmission of the optical signals passing through the concentrated Raman amplifier.

5. The optical system of claim 2, wherein the concentrated Raman amplifier is configured as a signal varying device to provide at least two of amplification, attenuation and lossless transmission of the optical signals passing through the concentrated Raman amplifier.

6. The optical system of claim 2, wherein the concentrated Raman amplifier includes a second pump source configured to counter-propagate optical energy relative to the optical signals in a plurality of different pump wavelength to provide Raman amplification of the optical signals passing through the concentrated Raman amplifier.

7. The optical system of claim 1, wherein each of the plurality of optical amplifiers includes:
a first pump source configured to provide optical energy in a first set of pump wavelengths to produce Raman gain having a first signal variation profile in the optical signals over the signal wavelength range, and
an erbium doped fiber amplifier including an erbium doped optical fiber and an optical pump source configured to provide optical energy in a plurality of pump wavelengths to the erbium doped optical fiber to produce erbium gain having a second signal variation profile in the optical signals over the signal wavelength range.

8. The optical system of claim 1, wherein at least one of the plurality of optical amplifiers includes:
a second pump source configured to provideoptical energy in a second set of pump wavelengths to produce Raman gain having a second signal variation profile in the optical signals over the signal wavelength range, wherein the first and second signal variation profiles provide for a cumulative signal variation profile over the signal wavelength range that differs from either of the first and second signal variation profiles.

9. The optical system of claim 1, wherein the plurality of optical amplifiers each include a local controller configured to control the optical amplifier.

10. The optical system of claim 2, wherein the local controllers are configured to control the amplifiers locally and with instructions from the controller.

11. The optical system of claim 1, wherein the controller is configured to provide instructions to the at least one of the plurality of optical amplifier based on the signal power over the signal wavelength range.

12. The optical system of claim 1, wherein the controller is configured to provide instructions to the at least one of the plurality of optical amplifier based on the signal power over the signal wavelength range to achieve a desired gain flatness over the signal wavelength range.

13. The optical system of claim 1, wherein the desired gain flatness is ±1 dB.

14. The optical system of claim 1, wherein the at least one optical amplifier includes an attenuator.

15. An optical system comprising:
   a plurality of optical nodes configured to communicate via optical signals in at least one signal wavelength range passing through an optical fiber, and,
   a plurality of optical amplifiers positioned to amplify the optical signals passing between the optical nodes, wherein at least one of the plurality of optical amplifiers includes:
      a first pump source configured to counter-propagate optical energy relative to the optical signals in a first set of pump wavelengths to produce Raman gain having a first signal variation profile in the optical signals passing through the optical fiber over the signal wavelength range, and
      a concentrated Raman amplifier configured to produce Raman gain in the optical signals past through the concentrated Raman amplifier having a second signal variation profile in the optical signals over the signal wavelength range; and,
   a controller positioned proximate at least one of the optical nodes and configured to control the plurality of optical amplifiers to achieve a desired signal characteristic in the optical signals, when the optical signals reach the at least one of the optical nodes proximate the controller.

16. The optical system of claim 15, wherein the concentrated Raman amplifier is configured as a signal varying device to provide at least one of amplification, attenuation, and lossless transmission of the optical signals passing through the concentrated Raman amplifier.

17. The optical system of claim 15, wherein each of the plurality of optical amplifiers includes:
   a first pump source configured to provide optical energy in a first set of pump wavelengths to produce Raman gain having a first signal variation profile in the optical signals over the signal wavelength range; and,
   a local controller configured to provide local control of the amplifier, as well as implement instructions to control the amplifier from the controller.

* * * * *

UNITED STATES PATENT AND TRADEMARK OFFICE
CERTIFICATE OF CORRECTION

| | | |
|---|---|---|
| PATENT NO. | : 7,046,430 B2 | Page 1 of 1 |
| APPLICATION NO. | : 10/914109 | |
| DATED | : May 16, 2006 | |
| INVENTOR(S) | : Stephen G. Grubb et al. | |

It is certified that error appears in the above-identified patent and that said Letters Patent is hereby corrected as shown below:

Column 18, Claim 8, ln. 54, delete "provideoptical" and insert -- provide optical --

Column 18, Claim 10, ln. 65, delete "claim 2" and insert -- claim 9 --

Signed and Sealed this

Eighth Day of December, 2009

David J. Kappos
*Director of the United States Patent and Trademark Office*